US012156177B2

(12) United States Patent
Freda et al.

(10) Patent No.: US 12,156,177 B2
(45) Date of Patent: Nov. 26, 2024

(54) SYSTEMS AND METHODS FOR SIDELINK COMMUNICATION

(71) Applicant: InterDigital Patent Holdings, Inc., Wilmington, DE (US)

(72) Inventors: Martino Freda, Laval (CA); Paul Marinier, Brossard (CA); Tao Deng, Roslyn, NY (US); Ghyslain Pelletier, Montreal (CA); Chunxuan Ye, San Diego, CA (US); Tuong Duc Hoang, Montreal (CA); Moon-il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 430 days.

(21) Appl. No.: 17/442,647

(22) PCT Filed: Mar. 25, 2020

(86) PCT No.: PCT/US2020/024647
§ 371 (c)(1),
(2) Date: Sep. 24, 2021

(87) PCT Pub. No.: WO2020/198317
PCT Pub. Date: Oct. 1, 2020

(65) Prior Publication Data
US 2022/0182979 A1 Jun. 9, 2022

Related U.S. Application Data

(60) Provisional application No. 62/824,071, filed on Mar. 26, 2019, provisional application No. 62/840,805, (Continued)

(51) Int. Cl.
*H04W 72/1263* (2023.01)
*H04W 72/02* (2009.01)
(Continued)

(52) U.S. Cl.
CPC ....... *H04W 72/02* (2013.01); *H04W 72/0453* (2013.01); *H04W 72/542* (2023.01); *H04W 72/56* (2023.01)

(58) Field of Classification Search
CPC .................................................. H04W 72/02
See application file for complete search history.

(56) References Cited

U.S. PATENT DOCUMENTS 10,212,651 B2  2/2019  Gulati et al.
10,405,327 B2  9/2019  Loehr et al.
(Continued)

FOREIGN PATENT DOCUMENTS

CN  102036390 A  4/2011
CN  107534829 A  1/2018
(Continued)

OTHER PUBLICATIONS

Ganesan et al., NR Sidelink Design Overview for Advanced V2X Service, 2020, IEEE, vol. 3 Issue 1, pp. 26-30 (Year: 2020).*
(Continued)

*Primary Examiner* — Peter Chen
*Assistant Examiner* — Jia Hao Deng
(74) *Attorney, Agent, or Firm* — Condo Roccia Koptiw

(57) ABSTRACT

Systems, methods, and instrumentalities are described herein that may be used to determine a destination for sidelink transmission based on the priority of the transmission and/or other parameters associated with the transmission. In examples, a destination may be selected if one or more logical channels associated with the destination have a bucket size parameter exceeding a certain threshold and the one or more logical channels have a highest priority. Various other techniques are also described herein that relate to the
(Continued)

configuration and/or report of QoS information, selection of sidelink resources, use of a minimum communication range, etc.

18 Claims, 6 Drawing Sheets

Related U.S. Application Data filed on Apr. 30, 2019, provisional application No. 62/867,597, filed on Jun. 27, 2019, provisional application No. 62/886,161, filed on Aug. 13, 2019, provisional application No. 62/930,943, filed on Nov. 5, 2019.

(51) Int. Cl.
*H04W 72/0453* (2023.01)
*H04W 72/12* (2023.01)
*H04W 72/20* (2023.01)
*H04W 72/542* (2023.01)
*H04W 72/56* (2023.01)
*H04W 92/18* (2009.01)

(56) References Cited

U.S. PATENT DOCUMENTS

| | | | |
|---|---|---|---|
| 10,893,557 | B2 | 1/2021 | Gulati et al. |
| 11,013,015 | B2* | 5/2021 | Loehr .............. H04W 28/0278 |
| 2017/0245292 | A1 | 8/2017 | Agiwal et al. |
| 2017/0257876 | A1 | 9/2017 | Loehr et al. |
| 2019/0053251 | A1 | 2/2019 | Loehr et al. |
| 2019/0059071 | A1 | 2/2019 | Khoryaev et al. |

FOREIGN PATENT DOCUMENTS

| | | |
|---|---|---|
| CN | 108541389 A | 9/2018 |
| TW | 201844026 A | 12/2018 |
| WO | 2016120940 A1 | 8/2016 |

OTHER PUBLICATIONS

3$^{rd}$ Generation Partnership Project (3GPP), R2-1808916, "Introduction of eV2X in 36.321", LG Electronics Inc., 3GPP TSG-RAN2 Meeting #102, Busan, Republic of Korea, May 21-25, 2018, 14 pages.
3$^{rd}$ Generation Partnership Project (3GPP), TR 38.885 V1.1.0, Technical Specification Group Radio Access Network; NR; Study on Vehicle-to-Everything (Release 16), Mar. 2019, 111 pages.
3$^{rd}$ Generation Partnership Project (3GPP), R2-1811260, "Issue on transmission format selection in TS 36.321", 3GPP TSG-RAN WG2 Meeting #103, Gothenburg, Sweden, Aug. 20-24, 2018, 3 pages.
3$^{rd}$ Generation Partnership Project (3GPP), TR 23.786 V0.8.0, Technical Specification Group Services and System Aspects; Study on architecture enhancements for EPS and 5G System to support advanced V2X services (Release 16), Aug. 2018, 78 pages.
3$^{rd}$ Generation Partnership Project (3GPP), TS 23.303 V15.1.0, Technical Specification Group Services and System Aspects; Proximity-based services (ProSe); Stage 2 (Release 15), Jun. 2018, 130 pages.
3$^{rd}$ Generation Partnership Project (3GPP), TS 36.213 V14.4.0, Technical Specification Group Radio Access Network; Evolved Universal Terrestrial Radio Access (E-UTRA); Physical layer procedures (Release 14).
3$^{rd}$ Generation Partnership Project (3GPP), TS 22.186 V15.2.0, Technical Specification Group Services and System Aspects; Enhancement of 3GPP support for V2X scenarios; Stage 1 (Release 15), Sep. 2017, 16 pages.
3rd Generation Partnership Project (3GPP), TR 22.886 V15.1.0, Technical Specification Group Services and System Aspects; Study on enhancement of 3GPP Support for 5G V2X Services (Release 15), Mar. 2017, 16 pages.
CN 102036390 (A), Cited in OA dated May 2, 2023.
CN 108541389 (A), U.S. Pat. No. 10,212,651 (B2).
TW 201844026 (A), U.S. Pat. No. 10,893,557 (B2).
3GPP R1-1901931, "Discussion on physical layer procedure for NR V2X", LG Electronics, 3GPP TSG RAN WG1 Meeting #96, Athens, Greece, Feb. 25-Mar. 1, 2019, 12 pages.

* cited by examiner

SYSTEMS AND METHODS FOR SIDELINK COMMUNICATION

CROSS-REFERENCE TO RELATED APPLICATIONS

This application is the National Stage Entry under 35 U.S.C. § 371 of Patent Cooperation Treaty Application No. PCT/US2020/024647, filed Mar. 25, 2020, which claims the benefit of U.S. provisional patent application No. 62/824,071, filed Mar. 26, 2019, U.S. provisional patent application No. 62/840,805, filed Apr. 30, 2019, U.S. provisional patent application No. 62/867,597, filed Jun. 27, 2019, U.S. provisional patent application No. 62/886,161, filed Aug. 13, 2019, and U.S. provisional patent application No. 62/930,943, filed Nov. 5, 2019, the contents of which are hereby incorporated by reference herein.

BACKGROUND

Modes of communication by wireless transmit receive units (WTRUs) may include vehicular communication such as vehicle-to-everything (V2X) communication. With vehicular communication, WTRUs may communicate directly with each other. Use cases for V2X operations may include in-coverage scenarios (e.g., in which a WTRU may receive assistance from the network to transmit and/or receive V2X messages), out of coverage scenarios (e.g., in which a WTRU may use pre-configured parameters to transmit and/or receive V2X messages), and/or the like. Types of V2X communication may include vehicle to vehicle or V2V communication (e.g., vehicular WTRUs communicating with each other directly), vehicle to infrastructure or V2I communication (e.g., a vehicular WTRU communicating with a roadside unit (RSU) or with a base station (eNB or gNB)), vehicle to network or V2N communication (e.g., a vehicular WTRU communicating with a core network), vehicle to pedestrian or V2P communication (e.g., a vehicular WTRU communicating with a WTRU under special conditions such as low battery capacity conditions), etc.

SUMMARY

Systems, methods, and instrumentalities are described herein that may relate to the selection of a destination (e.g., a destination ID or destination address associated with a destination device) for sidelink transmission. Such transmission may utilize sidelink resources that are configured by a network or selected (e.g., autonomously) by a wireless transmit receive unit (WTRU), e.g., from a preconfigured resource pool. The WTRU may select the destination based on one or more transmission parameters associated with the destination and/or a priority associated with the destination. In examples, the WTRU may identify one or more logical channels in response to determining that the one or more logical channels have data available for transmission and that respective bucket size parameters of the logical channels have a value greater than zero. On a condition of identifying the logical channels, the WTRU may select a first destination for the sidelink transmission on a condition that the first destination is associated with a first logical channel that has a highest priority (e.g., highest logical channel priority) among the one or more identified logical channels. The WTRU may then transmit data associated with the first logical channel to the first destination using at least a portion of the resources available to the WTRU.

The WTRU may identify a second logical channel (e.g., in addition to the first logical channel) from the one or more identified logical channels. The WTRU may multiplex the transmission of the second logical channel with the transmission of the first logical channel. The WTRU may select the second logical channel based on the second logical channel having a minimum communication range that is within a distance of the minimum communication range of the first logical channel and based on the second logical channel having a priority and a bucket size parameter exceeding certain thresholds.

The WTRU may determine that there is a second destination associated with a logical channel having the same highest priority and a bucket size parameter greater than zero. The WTRU may select the first destination over the second destination if the WTRU determines that selecting the first destination may result in fewer resources being utilized to transmit data that exceeds a bucket size requirement than selecting the second destination (e.g., selecting the first destination may result in fewer resources being used to transmit non-prioritized data than if the second destination were selected).

The systems, methods, and instrumentalities described herein may relate to the management of quality of service (QoS) requirements. A WTRU may use different messages to report QoS information for different data types. The WTRU may report buffer status for different data types, wherein different buffer status reports (BSRs) may have different logical channel-to-logical channel group mappings (LCH-to-LCG mappings). The WTRU may use different messages to report different QoS information. The WTRU may utilize a multiple-stage configuration associated with QoS parameters and/or LCGs (e.g., a multi-stage BSR). The WTRU may be configured with multiple destination indices for a destination, e.g., so that the WTRU may convey buffer status information with different QoS characteristics.

The WTRU may select an amount of resources and/or one or more carriers based on a given data rate. The WTRU may select one or more carriers for transmission that may satisfy a given data rate. The WTRU may perform carrier/resource reselection based on rate-related triggers. The WTRU may perform carrier and/or resource reselection based on metrics associated with the resources used with a peer WTRU. The WTRU may send indication of a performed carrier/resource reselection to a peer WTRU.

A minimum communication range may be defined for a WTRU. Logical channel prioritization (LCP) may be performed in accordance with one or more LCH restrictions that may be based on the suitability of a transmission associated with a minimum communication range. The WTRU may select the data or LCH used for transmission parameter selection. The WTRU may use a target minimum communication range, for example to determine transmission parameters and/or to generate reports for a network. Transmission parameters (e.g., MCS) may be selected to attempt to maximize a metric (e.g., spectral efficiency). The WTRU may determine candidate resources based on a target transport block size.

A WTRU may determine an amount of allowable resources based on a measurement of a data rate (e.g., an achievable data rate), which may be derived from a CQI report. The WTRU may reserve or select up to a maximum computed rate of selected or reserved resources based on data rate requirements of a sidelink radio bearer (SLRB) associated with the WTRU. The WTRU may temporarily exceed the maximum rate of selected resources. The WTRU may be configured with different resource selection parameters for a sidelink process when the WTRU exceeds a certain data rate. The WTRU may differentiate constant bit rate and non-guaranteed bit rate (non-GBR) SLRBs in a flow-to-SLRB mapping and/or in rate computation. The WTRU may restrict and/or prioritize a subset of SLRBs to use a specific SL process or SL carrier. The WTRU may compute maximum rates separately for different sidelink process types.

A WTRU may trigger resource reselection based on a failure or error condition associated with logical channel prioritization. The WTRU may determine one or more SL processes on which to perform resource reselection based on one or more rate-related triggers. The WTRU may determine the reservation time (e.g., number of periods) for a periodic reservation based on one or more QoS parameters.

A WTRU may be configured with one or more rules for destination address selection during logical channel prioritization. For example, the WTRU may be configured with rules indicating how the WTRU should combine conditions or criteria for destination selection. The WTRU may select a destination address based on the value of a QoS parameter associated with a logical channel for that destination. The WTRU may select a destination address based on whether the destination is associated with a largest weighted bucket size parameter (e.g., bucket size Bj). The WTRU may select a destination address based on whether the selection may minimize data that exceeds a Bj (e.g., so that grant usage such as grant usage for non-prioritized bit rate data or grant usage not corresponding to Bj>0 may be minimized). The WTRU may select a destination address based on the selection may satisfy one or more (e.g., a majority of) configured bucket sizes. The WTRU may select a destination address based on whether the selection may satisfy a greatest number of and/or a majority of the logical channels with pending data. The WTRU may select a destination address such that a bucket size or a total bucket size may be above a threshold. The WTRU may select a destination address based on a destination-specific bucket size. The WTRU may select a destination address according to a restriction against selecting the same destination address. The WTRU may select a destination address based on a timer such as a destination starvation avoidance timer.

The WTRU may determine which criteria (e.g., for destination selection) to use and/or the order in which the criteria are used based on channel conditions. The WTRU may determine which criteria to use and/or the order in which the criteria are used based on criticality of the condition. The WTRU may be configured to give certain destinations higher priority or weight when applying a decision criteria.

A WTRU may restrict or prioritize transmissions associated with a minimum communication range that falls within a certain communication range of a first selected LCH. A transmitting WTRU may use best-effort transmission parameters when a receiving WTRU is outside a minimum communication range (e.g., a minimum communication range associated with a SLRB). The receiving WTRU may send an indication of the WTRU's location and/or whether the WTRU is inside or outside a minimum communication range (e.g., a minimum communication range associated with a SLRB). The transmitting WTRU may be configured with a different or alternate set of transmission-related parameters when a receiving WTRU is outside of a minimum communication range (e.g., a minimum communication range associated with a SLRB). The transmitting WTRU may modify a flow-to-bearer mapping for a flow when a receiving WTRU is outside of a minimum communication range (e.g., a minimum communication range associated with a SLRB).

A WTRU may determine the condition(s) under which a particular or exceptional resource pool may be used. A receiving WTRU may send HARQ feedback along with a transmission range indication.

A WTRU may change one or more starvation avoidance parameters and/or behaviors based on a congestion condition. In examples, starvation avoidance may refer to rules, operating parameters, behaviors, efforts, etc. applied by a network and/or a WTRU so that the WTRU may avoid or mitigate shortage of resources for sending or receiving a transmission. A WTRU may decide whether to select an amount of data based on a bucket size parameter (e.g., Bj) in accordance with a channel busy ratio. The WTRU may decide whether to increase a bucket size parameter value (e.g., Bj) based on a measured congestion level. The WTRU may compute a bucket size parameter (e.g., Bj) differently based on the measured congestion level. The WTRU may select an amount of data as a function of a bucket size parameter (e.g., Bj) and the function may depend on the measured congestion level.

A WTRU may be configured to change a SLRB configuration (e.g., RLC mode) based on a channel busy ratio. The WTRU may be configured to favor (e.g., give higher priority to) transmissions with lower minimum communication range during congestion control. The WTRU may select an SLRB configuration that best represents the QoS profile of a flow. The WTRU may implement one or more LCP range restrictions for a minimum communication range.

BRIEF DESCRIPTION OF THE DRAWINGS

A more detailed understanding may be had from the following description, given by way of example in conjunction with the accompanying drawings wherein.

DETAILED DESCRIPTION

Figure 1A:
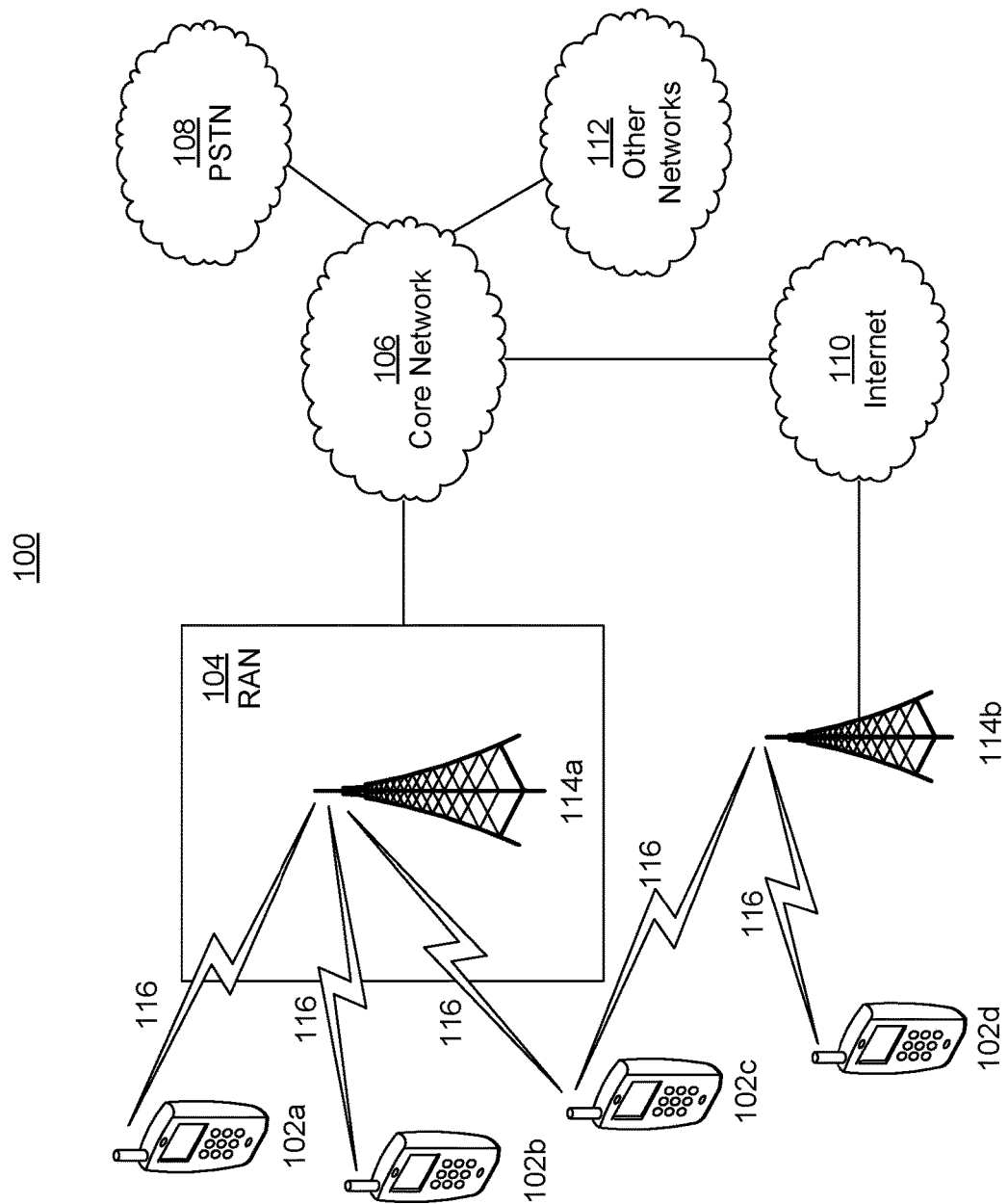
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
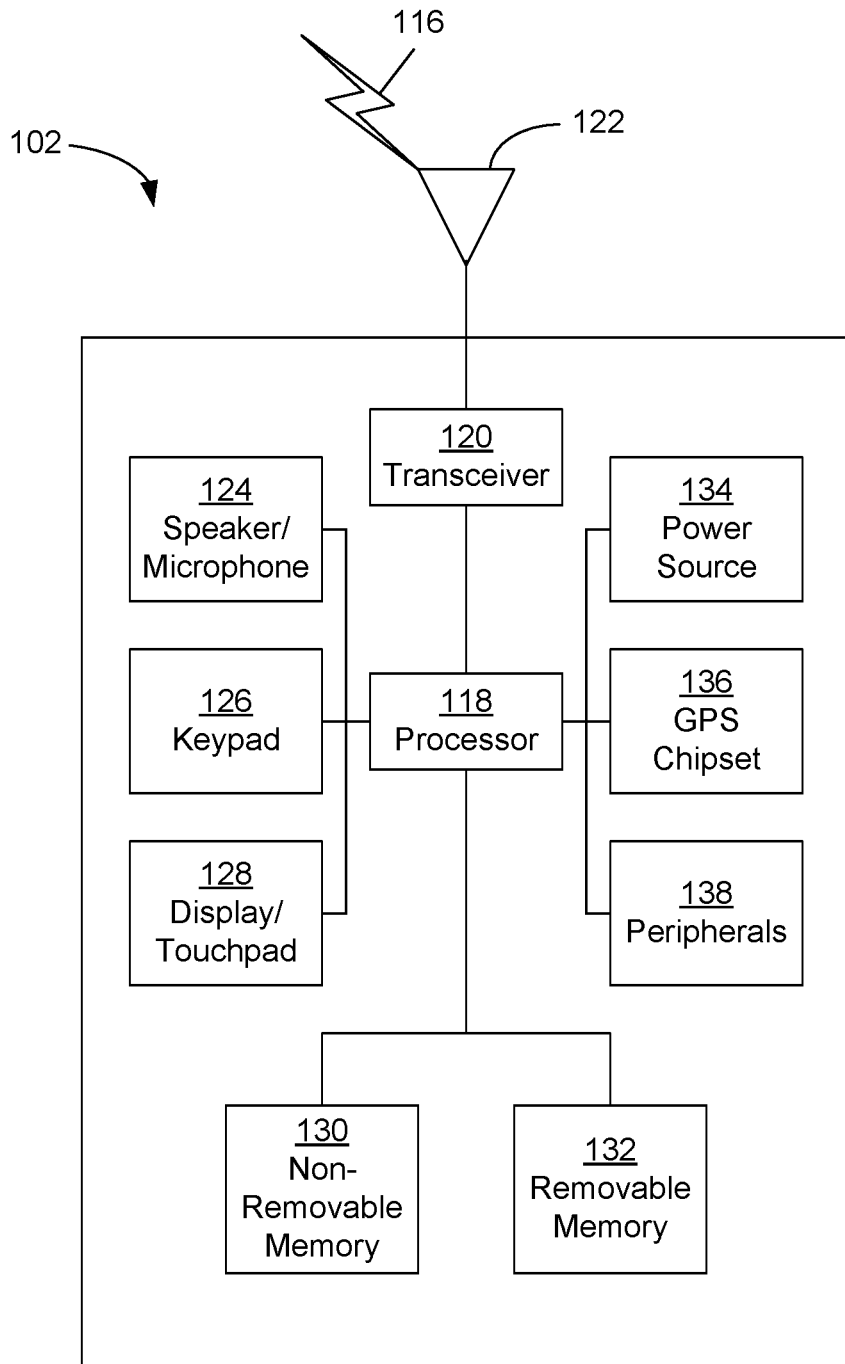
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
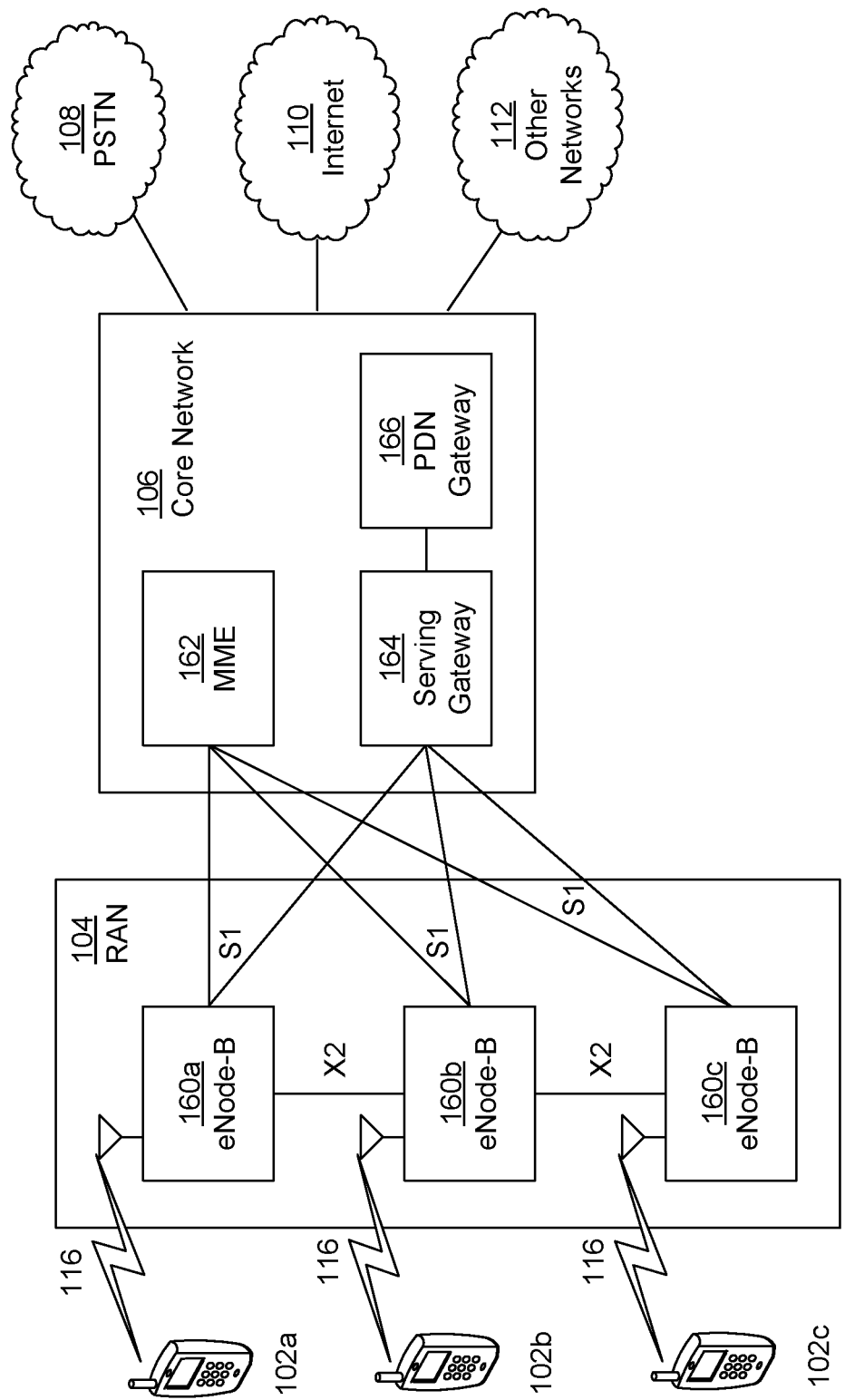
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
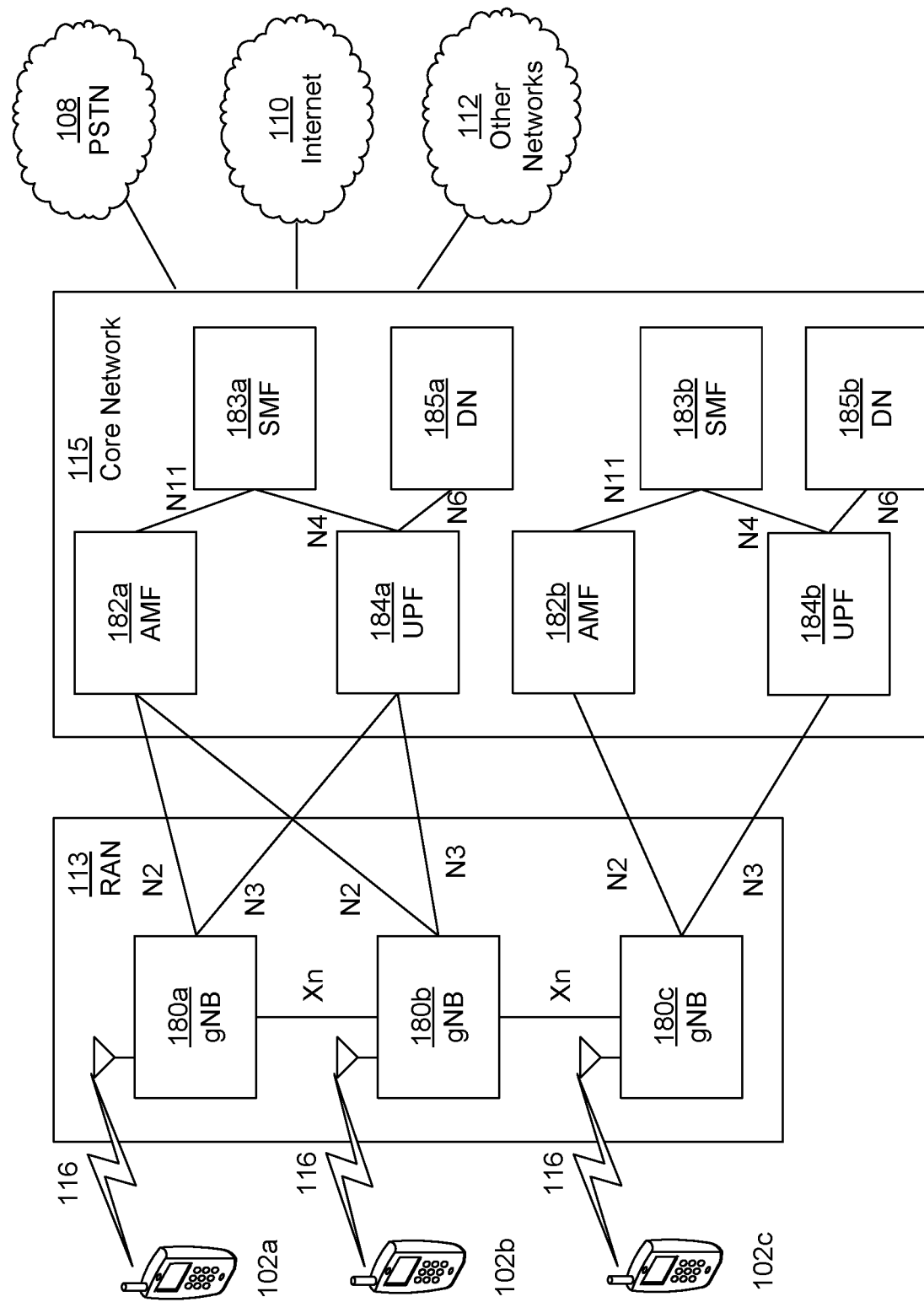
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

V2X communication may be performed in various modes (e.g., in at least two modes). In a first mode, the network (e.g., an eNB or gNB) may provide a WTRU with a scheduling assignment for V2X transmissions (e.g., for V2X sidelink transmissions). This first mode may be referred herein as NR Mode 1 (and/or simply mode 1), LTE Mode 3 (e.g., or simply Mode 3), and/or a network scheduled transmission mode. In a second mode, a WTRU may autonomously select resources from a configured (e.g., pre-configured) resource pool. This second mode may be referred herein as LTE Mode 4 (e.g., or simply Mode 4), NR Mode 2 (e.g., or simply Mode 2 and/or by reference to various sub-modes such as 2a, 2b, 2c, 2d, etc.), and/or an autonomous scheduling mode. Multiple categories of resource pools may be defined including, for example, receiving pools that a WTRU may monitor for receiving V2X transmissions, and/or transmitting pools from which a WTRU may select resources for transmitting information (e.g., such as in autonomous scheduling mode, e.g., in Mode 4). For WTRUs configured to operate in certain modes (e.g., Mode 3), transmitting pools may not be configured or may not be used.

Resource pools (e.g., for V2X communication) may be signaled (e.g., semi-statically or semi-persistently) to a WTRU, for example, via radio resource control (RRC) signaling. In certain modes (e.g., in an autonomous scheduling mode, e.g., Mode 4), a WTRU may perform sensing (e.g., measurements) before selecting a resource from a resource pool (e.g., from an RRC configured transmitting pool). Dynamic resource pool reconfiguration may or may not be supported. Resource pool configuration may be carried in a system information block (SIB), via dedicated RRC signaling, etc.

A New Radio (NR) system may support use cases such as enhanced Mobile Broadband (eMBB) and/or ultra-high reliability and low latency communications (URLLC). An NR system may support enhanced V2X (eV2X) communication. eV2X communication services may include services for safety and non-safety scenarios such as, for example, sensor sharing, automated driving, vehicle platooning, remote driving, and/or the like. Different eV2X services may have different performance requirements. For example, 3 ms latency may be required in some eV2X services.

One or more of the following use cases may be supported. Vehicles platooning may be supported to enable vehicles to dynamically form a group travelling together. One or more (e.g., all) of the vehicles in the platoon may receive data (e.g., periodic data) from a lead vehicle, for example, to carry on platoon operations. Such data may allow the distance between vehicles to be shortened. For example, when measured in time terms, the gap distance between vehicles can be short (e.g., less than a second). This may allow vehicles that follow the lead vehicle to be autonomously driven.

Advanced driving may be supported to enable semi-automated or fully-automated driving. Longer inter-vehicle distance may be assumed in these use cases. A (e.g. each) vehicle and/or RSU may share data obtained from local sensors with vehicles in its proximity, e.g., thus allowing the vehicles to coordinate their trajectories or maneuvers. A (e.g., each) vehicle may share its driving intention with vehicles in its proximity, e.g., to promote safe traveling, collision avoidance, and traffic efficiency.

Extended sensors may be supported to enable the exchange of raw or processed data such as data gathered through local sensors or live video/audio data among vehicles, RSUs, devices of pedestrians, V2X application servers, etc. As a result, vehicles may enhance the perception of their environment beyond what the vehicles' own sensors can detect so that the vehicles may have a more holistic view of the local situations.

Remote driving may be supported to enable a remote driver or a V2X application to operate a vehicle remotely, e.g., for people who cannot drive themselves or to maneuver a remote vehicle located in a dangerous environment. In examples (e.g., where environmental variations are limited and routes are predictable such as for public transportation), driving may utilize (e.g., be based on) cloud computing. Access to cloud-based back-end service platforms may be considered in such use cases.

A WTRU engaging in V2X services may support (e.g., simultaneously support) multiple wireless communication technologies (e.g., NR and LTE sidelink communication technologies).

As discussed herein, V2X communication may be performed in a network-scheduled mode and/or an autonomous mode. Such an autonomous mode may include a plurality of submodes. For example, in a first submode (e.g., Mode 2a), a WTRU may autonomously select sidelink resources for transmission. In a second submode (e.g., Mode 2c), a WTRU may be configured with a network configured grant (e.g., similar to a type-1 grant) for sidelink transmission. In a third submode (e.g., Mode 2d), a WTRU may schedule sidelink transmissions for other WTRUs. The functionality associated with the different submodes may be combined (e.g., one submode may be built into another). For example, in Mode 2b, a WTRU may be configured to assist the sidelink resource selection of other WTRUs.

A WTRU performing V2X communication may utilize a broadcast mechanism at an application (AS) layer. A WTRU engaging in V2X communication may be provided with an L2 (e.g., layer 2 including a MAC layer) destination ID (e.g., identifier) from upper layers. The L2 destination ID may correspond to a V2X service. The WTRU may include the L2 destination ID in the MAC header. Reception may be based on filtering MAC PDUs having an L2 destination ID matching the services the WTRU may be interested in.

A WTRU performing V2X communication may utilize unicast and/or groupcast transmission mechanisms (e.g., when the relevant use case is associated with stringent quality requirements such as those in vehicle platooning). With unicast and/or groupcast, a WTRU may utilize feedback from a receiving device (e.g., HARQ, CQI, etc.) to optimize transmission power and/or retransmissions, to allow efficient use of resources and better control of quality of service (QoS), etc.

A WTRU may implement one or more QoS models established for V2X communication. For example, the QoS over a communication interface (e.g., such as a PC5 interface) may be supported with ProSe Per-Packet Priority (PPPP). An application layer may be allowed to mark packets with PPPP, which may indicate a required QoS level. For example, by allowing the derivation of packet delay budget (PDB) based on PPPP, system performance targets may be realized.

Performance indicators and/or design goals associated with QoS may include one or more of payloads (e.g., in terms of bytes), transmission rates (e.g., in terms of message/sec), maximum end-to-end latency (e.g., in term of milliseconds), reliability (e.g., in terms of percentage of success or failure), data rates (e.g., in terms of mbps), or minimum communication ranges (e.g., minimum required communication ranges, e.g., expressed in terms of meters).

In some examples, a common set of service requirements may be applied to V2X communication over different interfaces (e.g., PC5-based V2X communication and/or Uu-based V2X communication).

A unified QoS model may be implemented, e.g., for PC5 and Uu. For example, 5G QoS indicators (e.g., 5QIs) may be used for V2X communication over PC5 such that the application layer can have a consistent way of indicating QoS requirements regardless of the link used.

There may be multiple (e.g., three) types of traffic for V2X-capable WTRUs. These may include, for example, broadcast, multicast, and unicast. For unicast traffic, the same QoS model as that for Uu can be utilized. For example, each unicast link may be treated as a bearer, and QoS flows may be associated with the unicast link. One or more (e.g., all) of the QoS characteristics defined in 5QIs and/or one or more parameters associated with transmission data rates may be applied. A minimum communication range (e.g., a minimum required communication range) may be treated as a parameter specifically for PC5 use.

Similar considerations may be applied to multicast traffic (e.g., multicast may be treated as a special case of unicast with multiple defined receivers of the traffic).

For broadcast traffic, the concept of bearer may not apply. Each message may have different characteristics according to application requirements. 5QIs may be used in a similar manner as for PPPP or ProSe Per-Packet Reliability (PPPR). For example, one or more 5QIs may be tagged with a packet (e.g., with each packet). 5QIs may represent one or more (e.g., all) characteristics of a PC5 broadcast operation including latency, priority, reliability, etc. A group of V2X broadcast specific 5QIs (e.g., VQIs) may be defined for PC5 use.

In examples, V2X QoS requirements may be limited to PPPP and PPPR, which may represent latency, priority, and/or reliability requirements. In examples, data rate and/or minimum communication range requirements may also be supported. Support for these requirements in the context of network-scheduled operation (e.g., Mode 1 described herein) and/or WTRU-autonomous operation (e.g., Mode 2 described herein) may be considered. In network-scheduled operation, the network may have or may acquire knowledge of the QoS requirements associated with a sidelink radio bearer (e.g., so as to properly schedule grants). In WTRU-autonomous mode, QoS requirements may be taken into account for carrier selection and/or reselection.

A WTRU may report the QoS of data available in its buffer for proper scheduling by the network (e.g., in network scheduled mode such as Mode 1 described herein). A WTRU may have data associated with a different number of QoS or QoS-related parameters, and may report buffer status related to such data to the network. For example, a WTRU may receive a first type of data associated with only a single QoS parameter (e.g., PQI-PC5 Quality Indicator), a second type of data associated with two QoS parameters (e.g., PQI and data rate, PQI and range), and a third type of data associated with three QoS parameters (e.g., PQI, data rate, and range).

Although examples described herein may be explained in terms of V2X communications, these examples and/or embodiments may be more generally applicable to other types of communications. For example, they may be applied to other types of sidelink communications, communications with network-based Radio Access Network (RAN) nodes, and/or other types of direct device to device (D2D) communications.

When used herein, data type may refer to data associated with a common set of one or more QoS parameters. A QoS parameter may indicate one or more quality characteristics associated with data. A WTRU may receive quality characteristics associated with certain data from an upper layer when the data is received in the WTRU's buffers for transmission. Such quality characteristics may be provided to the WTRU with a (e.g., each) packet from the upper layer. Such quality characteristic may be received by the WTRU in association with a flow initiated from the upper layer. For example, the upper layer may initiate a flow and attach a quality characteristic to the flow. The WTRU may receive the quality characteristic in the form of a flow ID with each packet from the upper layer.

A WTRU may report information related to the QoS of data in the WTRU's buffers using a single message or multiple messages. In the case of multiple messages, the QoS information may be of different types and/or formats, and may be reported with different frequencies (e.g., periodicities) and/or triggers. The messages may include an RRC message, a MAC control element (CE) including but not limited to a buffer status report (BSR), and/or PHY layer signaling such as a scheduling request (SR) indication on the physical uplink control channel (PUCCH).

A WTRU may use a single message to report QoS information. The message may comprise multiple portions (e.g., multiple distinct portions). For example, a WTRU may use a MAC CE with multiple information elements (IEs) to report QoS information. The IEs may have different formats and may include different information, depending on the QoS to be reported.

When referred to here, using a different message (e.g., to report QoS information) may include using one or more different IEs (e.g., with different formats) of a message (e.g., to report QoS information).

A WTRU may use a different message to report QoS information of a different data type. In examples, a WTRU may report the presence of data (e.g., amount of data, buffer status, initiation of data, etc.) with a different message and/or a different message format depending on the data type. For instance, a WTRU may use a first message or a first portion of a message (e.g., with a specific format) to report buffer status associated with a first data type. The WTRU may use a second message or a second portion of a message (e.g., with a specific format that may be different from the format of the first message) to report buffer status associated with a second data type.

In examples, a WTRU may report the buffer status of data with one QoS parameter (e.g., PQI) using a first MAC CE (e.g., BSR) and report the buffer status of data associated with multiple QoS parameters (e.g., PQI and data rate, PQI and range, etc.) with a second MAC CE (e.g., BSR). The WTRU may indicate the message type of a message (e.g., in the form of a MAC CE type, RRC message type, an explicit indication, etc.).

The messages described herein may have different properties or formats. For example, a WTRU may report the buffer status of different data types with different BSRs, and the BSRs may be associated with different logical channel (LCH) to logical channel group (LCG) mappings. The messages may use different configurations for LCH-to-LCG mapping. The messages may be associated with different sets of LCHs and/or different types of LCH-to-LCG mappings.

For example, in a first message, the WTRU may report buffer status for a first set of LCHs (e.g., those associated with PQI only) based on a first mapping of LCH to LCG. The WTRU may report a buffer status for each LCG, for example, by computing the amount of data in all LCHs mapped to that LCG based on a first configuration. In a second message, the WTRU may report the buffer status for a second set of LCHs (e.g., those associated with PQI and data rate). The second set of LCHs may have a different configured LCH-to-LCG mapping.

The messages described herein may be of different types and/or different formats. For example, a first message may be a MAC CE while a second message may be an RRC message. The messages may use different numbers of bits to report buffer status for each LCG and/or may use different numbers of bits for a destination address (or for any other report element). The messages may not all include the same data fields. For example, one or more of the messages may not have a certain field present (e.g., one or more messages may not include an indication of unicast/groupcast/broadcast or a destination ID).

A WTRU may transmit a first message based on triggers associated with a first data type and may transmit a second message based on triggers associated with a second data type. For example, if data arrives at the WTRU for a first data type, and/or the data may be associated with a LCG configured for the first data type, the WTRU may report the first message only. If data arrives at the WTRU for a second data type, and/or the data may be associated with a LCG configured for the second data type, the WTRU may report the second message only.

A WTRU may use different messages or different parts of a message to report QoS information (e.g., buffer status) of different characteristics. For example, a WTRU may use a first message to report information related to a first QoS characteristic (e.g., PQI) and a second message to report information related to a second QoS characteristic (e.g., range), where a subset of the data associated with the second QoS characteristic may also be associated with the first QoS characteristic.

A WTRU may report the buffer status of data (e.g., all data) having at least one QoS parameter (e.g., PQI) in a MAC CE (e.g., in a BSR). In the example given above, the WTRU may report, in the second message, information about a subset of data reported in the first message if the subset of data is also associated with the second QoS characteristic (e.g., range). The second message may include a MAC CE which in turn may include one or more of the following pieces of information.

The MAC CE may include the amount of data associated with the second QoS characteristic (the amount of data may also be reported in the first message).

The MAC CE may include a specific rule for LCH-to-LCG mapping that is used in the second message, for example, if the WTRU is configured to use multiple LCH-to-LCG mappings and/or QoS-to-LCG mappings and to choose an appropriate mapping from the configured mappings.

The MAC CE may include the amount of data reported in both the first and second message, or the amount of data reported in the second (or first) message that is not reported in the first (or second) message.

The MAC CE may include a specific QoS characteristic (e.g., range, data rate, etc.).

The MAC CE may include a reference or an identifier that identifies the corresponding first message (e.g., a transaction ID, a time reference, or a message number/message index of the first message).

The MAC CE may include the logical channel group(s) for which the second message is providing information about additional QoS.

The MAC CE may include an explicit or implicit indication of the QoS value(s) or range of QoS values associated with the second QoS characteristic.

A WTRU may report, in a second message, a subset of data previously reported in a first message if the subset of data is associated with a second QoS parameter reported by the second message. For example, a WTRU may report a first message (e.g., a BSR) which provides buffer status report for each LCG configured in terms of a first QoS parameter (e.g., PQI). The WTRU may be configured with a set of LCHs, wherein each LCH may be associated with one or more values of the first QoS parameter. The WTRU may be configured with a mapping of the LCHs and one or more LCGs and/or a mapping between the first QoS parameter and one or more LCGs. The WTRU may report buffer status for each LCG in the BSR, for example, by reporting the amount of data associated with the LCHs that are mapped to the LCG. The WTRU may report in a second message (e.g., in the form of a MAC CE or by including additional IEs in the BSR) the amount of data available for transmission that was reported in the first message and that is associated with a second QoS parameter (e.g., range). The WTRU may report the explicit value(s) of the second QoS parameter in the second message.

A WTRU may have data associated with a first QoS parameter (e.g., PQI) only and/or data associated with a first and a second QoS parameters (e.g., PQI and range). The WTRU may use a single message to report BSR for all of the data, for example by using different IEs to report data associated with only PQI and data with both PQI and range. In examples (e.g., for data associated only with PQI), the WTRU may report one or more of destination, LCG, or buffer status, wherein the LCG may correspond to a mapping of PQI to LCG as configured by the network. In examples (e.g., for data associated with both PQI and range), the WTRU may add one or more instances of a range parameter (e.g., which may be associated buffer status or buffer status percentage). The range parameter may include one or more of the following.

The range parameter may include an explicit indication of the range parameter (e.g., range in meters) associated with part or all of the data reported for that LCG.

The range parameter may include an index (e.g., to a configured table) into a set of values of the range parameter that are associated with part or all of the data reported for that LCG.

A WTRU may indicate, for one or more IEs (e.g., for each IE), the format of the IE used (e.g., whether a range parameter is included and/or how many values of the range parameter are include). A WTRU may use another field in the BSR (e.g., a destination index) to indicate the format of the IE.

A WTRU may report QoS information based on mappings between different QoS parameters and LCGs. A WTRU may be configured with a first mapping of a first QoS parameter (e.g., PQI) to one or more LCGs and/or a second mapping of a second QoS parameter (e.g., data rate) to one or more LCGs. The WTRU may report, in a first message, the amount of data associated to each LCG of the first mapping. The WTRU may report, in a second message, the amount of data associated to each LCG of the second mapping. The WTRU may report (e.g., in a first message, in a second message, or in a different message other than the first or second message) the amount of data that may be associated to a specific LCG and that may have already been reported in both a first message and a second message. The WTRU may report (e.g., in a first message, in a second message, or in a different message other than the first or second message) the total amount of data in the WTRU's buffer.

A WTRU may report QoS information based on a multiple-stage configuration associated with QoS parameters and/or LCGs (e.g., in a multi-stage BSR). A WTRU may be configured to report QoS related information (e.g., buffer status) for a set of configured logical channel groups in multiple stages whereby the configuration of a LCG may not necessarily depend on an actual QoS parameter. For example, a WTRU may be configured with a number of LCGs, where each LCG may be tied to one or more QoS characteristics (e.g., PQI, rate, range, etc.).

In a first stage, the WTRU may report QoS information (e.g., buffer status) associated with one or more subsets of LCGs. The WTRU may report QoS information (e.g., a buffer status) associated with a subset of one or more LCGs if any LCH belonging to the LCG(s) have data available in the buffer. In a second stage, the WTRU may report QoS information (e.g., buffer status) associated with each LCG or only those LCGs for which buffer status was reported in a corresponding subset of LCG(s) during the first stage.

The QoS information reported in a stage may be in the form of one or more of a LCG (e.g., in terms of an index), a LCG subset (e.g., in terms of an index) whereby each LCG subset index may identify a set of indexed LCGs, an actual amount of data in the WTRU's buffers that correspond to a LCG or a subset of LCGs, an indication that some data is available for transmission in a LCG or a subset of LCGs (e.g., the WTRU may report buffer status for a LCG as a percentage of the buffer status reported in a previous message), a percentage of a total amount of data where the total amount of data may be reported separately or in a different stage, or any other QoS related information discussed herein.

A WTU may report buffer status associated with a (e.g., each) subset of LCGs in a first stage, and may report, in a second stage, a percentage of the buffer status (e.g., relative to the buffer status reported in the first stage) for each LCG in a subset of LCGs.

A WTRU may be configured, e.g., by the network, with a mapping of QoS to LCG(s) and/or a mapping of LCG(s) to LCG subset(s). Such configuration may be in the form of an RRC configuration, a MAC CE, or another suitable form. For example, a WTRU may be configured with a mapping of one or more QoS parameters to one or more LCGs. The mapping may indicate data associated with at least one QoS parameter (e.g., LCG 1=all data associated with PQI1, PQI2, and/or PQI3, regardless of the values of other QoS parameters or whether such data is associated with the other QoS parameters). The mapping may indicate data associated with multiple QoS parameters (e.g., LCG 1=all data associated with PQI1 and data rate v1).

A WTRU may be configured with a mapping of one or more LCGs to one or more LCG subsets. For example, a WTRU may be configured with 64 LCGs. The WTRU may be further configured to map LCG 1-8 to LCG subset 1, LCG 9-16 to LCG subset 2, and so on.

A WTRU may be configured with multiple mappings and may change from one mapping to another based on a network indication. For example, the WTRU may receive a set of configurations from the network (e.g., via RRC) and may switch from one configuration to another configuration upon receipt of a MAC CE.

A WTRU may autonomously change QoS to LCG mapping and/or LCG to LCG subset mapping. A WTRU may change (e.g., switch from one to another) among a subset of preconfigured mappings (e.g., as provided by the network). A WTRU may indicate a selected mapping to the network, e.g., as part of the signaling performed by the WTRU in a first stage. A WTRU may change a mapping based on one or more of the following.

A WTRU may change a mapping in response to new data arriving in the WTRU's buffers and/or based on current data in the WTRU's buffers. For example, a WTRU may determine, based on the data available for transmission, the mapping of QoS to LCG(s) and/or LCG(s) to LCG subset(s) to minimize the amount of information to be sent in accordance with the number of LCG subsets or the number of LCGs for which buffer status is to be reported and/or in accordance with the size of a report (e.g., a BSR).

A WTRU may change a mapping based on the size of a grant from the network. For example, a WTRU may select a configuration of QoS to LCG(s) and/or LCG(s) to LCG subset(s) so that a corresponding report of QoS information (e.g., during a first stage and/or a second stage as described herein) may be transmitted using a corresponding grant from the network.

A WTRU may change a mapping based on the conditions of a sidelink (SL) channel. For example, a WTRU may select a configuration of QoS to LCG(s) and/or LCG(s) to LCG subset(s) based on current measurements of constant bit rate (CBR), SL HARQ feedback, SL channel state information (CSI), SL radio resource management (RRM), and/or other similar SL measurements. The WTRU may provide a preliminary mapping of QoS to LCG(s) under conditions where QoS parameter(s) can be met (e.g., low CBR) and may provide a finer mapping of QoS to LCG(s) under conditions where QoS parameter(s) may be more difficult to meet (e.g., high CBR).

A WTRU may be configured with multiple destination indices (e.g., for conveying buffer status information with different QoS characteristics to a destination). For example, a WTRU may be configured with multiple destination indices for a single destination address (e.g., a V2X L2 destination ID), and may use the different destination indices to report different sets of QoS information and/or buffer status.

For example, a WTRU may be configured with two destination indices (e.g., D1 and D2) associated with the same destination address (e.g., an L2 destination ID). The WTRU may report, to the destination, the amount of data available for transmission that is associated with a first QoS parameter (e.g., PQI) using D1 in a BSR. The WTRU may report, to the destination, the amount of data available for transmission that is associated with a second QoS parameter (e.g., data rate) using D2 in a BSR.

Mode 2 transmission (e.g., autonomous transmission) may be supported. An associated data rate may be computed, selected, and/or reselected.

A WTRU may select an amount of resources and/or one or more carriers based on data rate requirements such as a data rate requirement associated with a transmission. The transmission may comprise one or more PDU(s) or packet(s) to be transmitted, one or more logical channels, one or more sidelink radio bearers (SLRBs), one or more sidelink processes, a number of transmissions associated with periodic data at the WTRU, and/or transmissions associated with aperiodic (e.g., one-shot) transmission at the WTRU.

A WTRU selecting the number of resources and/or carriers based on a relevant data rate may comprise the WTRU selecting one or more of the following.

The WTRU may select a minimum, maximum, and/or average number of time/frequency resources (e.g., subchannels) to be used to perform a transmission, e.g., over a configured time period.

The WTRU may select a minimum, maximum, and/or average number of carriers, bandwidth parts (BWPs), and/or beams to be used to perform the transmission.

The WTRU may select a minimum, maximum, and/or average number of sidelink processes used to perform the transmission.

The WTRU may select a minimum, maximum, and/or average number of times (e.g., successive times) the WTRU can re-use a resource (e.g., a reserved resource) before performing a procedure associated with the acquisition of the resources (e.g., resource selection based on sensing).

The WTRU may select a minimum, maximum, and/or average number of frequency resources.

The WTRU may select a minimum, maximum, and/or average number of periodicities. Either or both of these selections may be associated with one or more periodic sidelink processes.

A WTRU may select a number of resources and/or carriers based on achievable data rates of the resources and/or carriers (e.g., as determined by the WTRU using associated CSI reporting). For example, a WTRU may determine a range of achievable data rates based on CQI associated with the resources and/or carriers over a configured (e.g., preconfigured) period. A WTRU may determine a range of achievable data rates based on the transport block size (TBS) configured (e.g., pre-configured) for one or more CQI values (e.g., for each CQI value).

The range of achievable data rates as described herein may include one or more of a minimum data rate, a maximum data rate, an average data rate, or an x-percentile data rate. An x-percentile data rate may refer to a data rate higher than x % of all determined data rates. For example, a median data rate may refer to a 50-percentile data rate.

A WTRU may determine its data rate requirements at a given time based on the number or set of active or configured SLRBs at the WTRU. A WTRU may determine its data rate requirements at a given time based on respective data rates associated with one or more SLRBs or logical channels (e.g., a data rate associated with each SLRB or logical channel) at the WTRU.

A WTRU may determine its data rate requirements based on the prioritized bit rate (PBR) and/or a higher layer rate-related parameter (e.g., such as a guaranteed bit rate or GBR) configured (e.g., preconfigured) for any or all of the configured or active SLRBs at the WTRU. For example, a WTRU may determine its required data rate as the sum of data rates of one or more (e.g., all) established (e.g., active) SLRBs associated with a GBR. Alternatively or additionally, a WTRU may be configured with respective data rate parameters for one or more SLRBs (e.g., a data rate parameter for each SLRB) and may use the sum of such data rates across the SLRBs.

The selection of resources described herein may be in the form of a ratio of resource, carriers, BWPs, and/or beams utilized by a WTRU over the total number of available resources, carriers, BWPs, and/or beams. For example, a WTRU may be configured with a maximum occupancy ratio associated with a set of SLRBs based on the data rates or aggregated data rates of the SLRBs.

The determination of the amount of resources from the data rate requirements for a transmission may be based on one or more configured or pre-configured rules. Such rule(s) may depend on other QoS requirements of the data, such as latency, priority, minimum communication range, and/or reliability. For example, a WTRU may be configured with a different number of resources and/or carriers to be used for a specific data rate requirement depending on the priority, latency, reliability and/or communication range of the data and/or CBR.

A WTRU may determine the number of allowable sidelink processes on a carrier based on the aggregated data rate of the SLRBs operating on that carrier.

A WTRU may determine the number of periodic time, frequency, and/or beam resources associated with a sidelink process that can be reserved during a resource selection procedure based on the aggregated data rate of the SLRBs mapped to that sidelink process. The number of time, frequency, and/or beam resources associated with a sidelink process that can be reserved may comprise the number of periods for which resources can be reserved without resource reselection.

A WTRU may determine the number of allowable (e.g., maximum) subchannels that can be selected by the WTRU (e.g., for a single transmission of a sidelink process associated with one or more SLRBs) based on the aggregated data rate of SLRBs mapped to such transmission. A WTRU may be configured with a maximum number of time/frequency resources (e.g., subchannels) that can be used by the WTRU over a fixed or configured (e.g., pre-configured) time window. The WTRU may select individual transmissions and/or SL processes within that time window such that the total number of resources selected within the window may not exceed a maximum associated with the aggregated data rate of the concerned SLRBs.

A WTRU may determine the number of allowed carriers for multicarrier transmission based on the aggregated data rate of the SLRBs associated with WTRU.

A WTRU may determine the maximum number of resources it can select or transmit on for a particular slot or group of slots, such as, for example, a channel occupancy ratio (CR) limit.

A WTRU may reserve and/or select resources in accordance with a maximum rate of resources (e.g., up to a maximum rate of resources). The resources may be reserved or selected resources. A rate of resources as described herein may correspond to an amount of resources selected or reserved per time interval. The time interval may be pre-defined (e.g., configured) by the network and/or the WTRU.

At a given time, a WTRU may be configured with or may determine a maximum amount of time/frequency resources that the WTRU may select or reserve over a configured time period such that the WTRU may comply with a maximum rate of selected resources. A WTRU may autonomously select or reserve a (e.g., any) number of time/frequency resources that can be used to transmit the data in the WTRU's buffers as long as the WTRU does not exceed a maximum rate of selected resources. Such rate of selected resources can be derived, e.g., based on the data rate requirement associated with one, multiple or all SLRBs (e.g., which may be associated with mode 2 transmissions).

A WTRU may select a number of resources (e.g., resources associated with one or more sidelink processes) that comply with a maximum rate of selected resources. For example, a WTRU may perform resource selection for one or multiple periodic sidelink processes such that the resulting rate of resources selected or reserved by the WTRU (e.g., the amount of resources per time interval) is less than or equal to a maximum rate of selected resources.

A WTRU may determine its current rate of selected resources by determining the total amount of resources selected for one or more (e.g., for all) of its sidelink processes. For example, for periodic sidelink processes, the WTRU may determine the rate of selected resources as the sum of the number of resources per time interval using the periodicity and size of reserved resources for one or more (e.g., for all) of the processes. In examples (e.g., for aperiodic sidelink processes), the WTRU may maintain a count of the number of asynchronous resources selected over a time window and calculate the rate of selected resources for this process based on the count and/or length of the time window.

A WTRU may use a combination of one or more of the following factors (e.g., in addition to or in lieu of rate requirements) to determine the maximum rate of selected/reserved resources.

A WTRU may use measured congestion of a resource pool (e.g., as indicated by a channel busy ratio or CBR) to determine the maximum rate of selected/reserved resources. For example, a WTRU may be configured (e.g., preconfigured) with a mapping between CBR range, total data rate requirement (e.g., over all SLRBs), and maximum rate of selected resources. The WTRU may determine its maximum rate of selected resources based on the measured CBR, the total rate requirement among the SLRBs configured or active at the WTRU, and the configured mapping.

A WTRU may use the QoS requirements of the WTRU's configured or active SLRB(s) to determine the maximum rate of selected/reserved resources. The QoS requirements may include priority, latency, reliability, communication range and/or other parameters in addition to or in lieu of data rate. For example, the WTRU may determine the number of SLRBs having priority, reliability, and/or rate higher than a configured (e.g., preconfigured) threshold and may determine the maximum rate of selected resources based on the number of such SLRBs. The WTRU may be allowed to increase its allowed rate of selected resources (e.g., relative to a default calculated amount) by a certain amount for a SLRB having priority, reliability, and/or rate larger than a threshold. The WTRU may increase or decrease the data rate requirement configured for a SLRB by a factor (e.g., the value of the factor may depend on a QoS parameter).

A WTRU may use allowed or configured maximum transmit power at the WTRU to determine the maximum rate of selected/reserved resources. For example, the WTRU may scale its allowed rate of selected resources up or down depending on the configured or allowed maximum transmit power at the WTRU.

A WTRU may use the MCS associated with a sidelink to determine the maximum rate of selected/reserved resources. For example, the WTRU may determine a maximum or target MCS to be used for sidelink transmissions. Such MCS may depend on one or more other factors described herein (e.g., such as the transmission speed of the WTRU). Such MCS may be derived based on channel measurements (e.g., such as CQI for the case of unicast). The WTRU may scale the maximum rate of selected resources based on the MCS to be used for sidelink transmissions.

A WTRU may use a computed value of an achievable data rate on a given carrier or for a specific selected (e.g., configured) MCS (e.g., as described herein) to determine the maximum rate of selected/reserved resources.

A WTRU may use its transmission speed to determine the maximum rate of selected/reserved resources. For example, the WTRU may increase or decrease its computed maximum rate of selected resources based on changes in the WTRU's transmission speed.

A WTRU may be allowed to exceed (e.g., temporarily exceed) a maximum rate of selected resources under certain conditions. For example, a WTRU may be allowed to temporarily exceed the maximum rate of selected resources based on a combination of one or more of the following.

A WTRU may be allowed to temporarily exceed a maximum rate of selected resources if the measured channel busy ratio is below a threshold.

A WTRU may be allowed to temporarily exceed a maximum rate of selected resources due to QoS requirements. For example, a WTRU may be allowed to temporarily exceed a maximum rate of selected resources if the maximum rate of reserved resources cannot satisfy the QoS requirements (e.g., latency, rate, etc.) of data buffered by the WTRU.

A WTRU may be allowed to temporarily exceed a maximum rate of selected resources when asynchronous data transmission is triggered (e.g., if the WTRU decides to initiate an asynchronous sidelink process).

A WTRU may be allowed to temporarily exceed a maximum rate of selected resources in accordance with the number of activated or initiated SLRBs meeting certain QoS requirements (e.g., in response to the number of such SLRBs exceeding a threshold).

A WTRU may be allowed to temporarily exceed a maximum rate of selected resources when data becomes available or buffered for one or more SLRBs meeting certain QoS requirements.

A WTRU may be allowed to exceed the maximum rate of selected resources for a period of time. Such a period of time may be configured (e.g. preconfigured), for example, by a network. For instance, a WTRU may initiate a timer at an event that triggers the WTRU to exceed the determined maximum rate of selected resources (e.g., as described above). The WTRU may continue to exceed the rate until the timer expires. A WTRU may be allowed to exceed the maximum rate of selected resources for a configured (e.g., preconfigured) number of periods of a SL process. A WTRU may be allowed to exceed the maximum rate of selected resources during one or more consecutive time windows (e.g., time periods). A WTRU may be configured with such time windows by a network. A WTRU may be configured to exceed the maximum rate of selected resources once every N time windows (e.g., at most once every N time windows). A WTRU may be allowed to initiate a sidelink process that would result in the WTRU exceeding the maximum rate of selected resources if one or more conditions (e.g., the conditions of CBR and/or QoS requirements as described herein) are satisfied. For example, if a measured CBR is below a threshold, and the WTRU initiates and/or has data for a number of SLRBs, the WTRU may initiate a new SL process and/or may perform resource reselection of a SL process. These SLRBs may not be configured with a rate-related requirement but may have a priority or latency related parameter that meets certain conditions (e.g., preconfigured conditions).

A WTRU may be configured with resource selection parameters for a SL process. These parameters may be different depending on whether they are associated with an event that triggers the WTRU to exceed the maximum rate of selected resources or whether they may cause the WTRU to exceed the maximum rate of selected resources.

A WTRU may use a different (e.g. a shorter or smaller) value of the reselection counter for such a SL process. A WTRU may use a different rule (e.g., in accordance with whether CBR is below a threshold) when deciding whether it can perform resource reselection for such a SL process.

A WTRU may differentiate GBR and non-GBR SLRBs in a flow-to-SLRB mapping and/or in rate computation. A WTRU may be configured with a SLRB of a first type, which may allow rate enforcement, and a SLRB of a second type, which may not allow rate enforcement. The WTRU may determine the SLRB type based on the presence or absence of a rate-related parameter. For example, a SLRB with a configured rate-related parameter may be considered a SLRB with rate enforcement. A SLRB with a PBR greater than zero may be considered a SLRB with rate enforcement. A SLRB with a PBR equal to zero may be considered a SLRB without rate enforcement.

A WTRU may determine the maximum rate of selected resources by a combination of rate-related parameters that may be configured (e.g., preconfigured) for one or more SLRBs (e.g. for each SLRB). A WTRU may consider only SLRBs that allow rate enforcement in the calculation of the total rate of selected resources.

A WTRU may be configured with a soft and/or a hard data rate requirement. The data rate requirement may be associated with a specific SLRB. For example, a WTRU may be configured with a hard data rate requirement for one SLRB (e.g., a SLRB having rate enforcement) and a soft data rate requirement for another SLRB (e.g., a SLRB not having rate enforcement). A WTRU may be configured (e.g., preconfigured) with an indication of whether a SLRB data rate requirement is a soft data rate requirement or a hard data rate requirement. A WTRU may determine the total rate of selected resources by treating hard and soft data rate requirements differently.

A SLRB with a soft data rate requirement may be given a different (e.g., smaller) weight than an SLRB with a hard data rate requirement during the computation of maximum rate of selected resources.

A SLRB with a soft data rate requirement may be ignored in the calculation of the rate of selected resources under certain conditions. The conditions may be associated with (e.g., may depend on) CBR, sensing results, channel quality, etc.

A WTRU may determine the maximum rate of selected resources based on rates attached to one or more SLRBs configured with rate enforcement. A WTRU may add a configured (e.g., preconfigured) or calculated amount or offset to the total rate of SLRBs not configured with rate enforcement. The value of such an offset may depend on QoS parameters in a SLRB configuration, CBR, channel quality, speed, network indication (e.g., which may be used to dynamically enable or disable the offset), coverage, etc.

A WTRU may restrict and/or prioritize a subset of SLRBs to use a specific SL process or carrier.

A WTRU may associate a subset of SLRBs with a specific sidelink process or carrier, e.g., based on one or more configured restrictions. In examples, the WTRU may perform sidelink resource selection for a periodic sidelink process in which the sidelink process may be useable for (e.g., only usable for) or may be prioritized for use with a subset of SLRBs. Rules for the restriction and/or prioritization of SLRBs may be determined based on one or more of the following factors.

The restriction and/or prioritization of SLRBs with a SL process or carrier may be based on a configured periodicity of a SLRB. For example, a WTRU may be configured to map SLRBs associated with a subset of periodicities onto a SL process selected with a specific periodicity.

The restriction and/or prioritization of SLRBs with a SL process or carrier may be based on a minimum communication range requirement. For example, a WTRU may select resources for a sidelink process associated with a specific minimum communication range (MCR) or a set of minimum communication ranges (MCRs). The selection of such resources to satisfy a minimum communication range may follow the examples described herein. Once selected, the sidelink process may be utilized by the WTRU for (e.g., only for) the SLRBs associated with the minimum communication range or the set of minimum communication ranges.

The restriction and/or prioritization of SLRBs with a SL process or carrier may be based on a cast type. For example, a WTRU may select resources for a periodic sidelink process associated only with a specific cast type (e.g., unicast, groupcast, or broadcast).

The restriction and/or prioritization of SLRBs with a SL process or carrier may be based on priority and/or latency related QoS parameter(s) configured by an upper layer. For example, a WTRU may be configured with a priority associated with one or more SLRBs (e.g., with each SLRB). The WTRU may perform resource selection for a sidelink process (e.g., a periodic sidelink process) associated with a specific priority or a range of priorities. The WTRU may allow (e.g., only allow) SLRBs associated with the priority or priorities to be used in that SL process.

A WTRU may enforce the restriction for a sidelink processes during a LCP procedure. In such a procedure, a grant for a specific sidelink process may allow (e.g., only allow) or prioritize the use of certain LCHs associated with a specific periodicity, range, cast type, priority, etc.

A WTRU may consider restrictions associated with logical channels and/or SLRBs mapped to a sidelink process and/or carrier when determining the amount of resources, processes, and/or carriers to be selected. For example, a WTRU may select a maximum, a minimum or an average number of resources associated with a periodic sidelink process based on the total PBR configured for the SLRBs that are allowed to be mapped to that specific sidelink process.

A WTRU may maintain different sidelink process types and compute selected resources separately for each type.

A WTRU may maintain one or multiple sidelink processes of different types. A WTRU may be allowed to transmit data on a specific sidelink process type only for certain logical channels. For example, a SLRB may be associated with (e.g., only with) sidelink processes of one or more types. A sidelink process of a specific type may be associated with (e.g., allowed to carry data from a logical channel of) one or more of the following.

A sidelink process of a specific type may be associated with certain QoS requirements. Such QoS requirements may include, for example, range of priority, latency, minimum communication range, data rate, reliability, and/or the like. A sidelink process of a specific type may be used in accordance with the presence or absence of such QoS requirements or associated parameter(s) in a LCH configuration.

A sidelink process of a specific type may be associated with a cast type (e.g., unicast, groupcast, or broadcast).

A sidelink process of a specific type may be associated with a PHY layer configuration. For example, a SL process may be associated with a specific PHY layer configuration such as a specific type of HARQ configuration (e.g., having HARQ enabled or disabled), a specific type of RLM/RLF configuration, a specific type of CQI measurement configuration (e.g., reference signal density, feedback frequency, etc.), and/or the like.

A WTRU may determine a maximum rate of selected resources separately for each sidelink process type. A WTRU may determine the maximum rate of selected resources in accordance with the SLRBs configured for that sidelink process type (e.g., according to the examples described herein). A WTRU may be configured with different rules for computing the maximum rate of selected resources, for example, depending on the sidelink process type.

A WTRU may use different rules (e.g., two different rules) for determining the number of resources, for example, depending on rate requirements. A WTRU may select an amount of resources based on whether the final amount of selected resources is above or below a threshold. The threshold may be determined, e.g., based on the data rate requirement of the transmission.

A WTRU may select an initial number of resources determined by the data rate requirement for a transmission (e.g., based on configured or pre-configured mapping of data rate requirement to resource amount). The WTRU may select additional resources beyond this initial amount of resources based on a mapping of CBR and/or priority to a maximum number of resources.

A WTRU may select one or more carriers for transmission based on a requisite transmission data rate. For example, a WTRU may select one or more carriers for a transmission (e.g., a transmission as defined herein) with an associated data rate based on measurements (e.g., sensing) of the resources on that carrier. The selection of such a carrier may be based on a determination that the carrier can support the required data rate. The selection of such a carrier may be made to avoid impact of the WTRU's own data rate on that of other WTRU(s) operating on the carrier. The selection of such a carrier may be based on a combination of the foregoing two factors. For example, a WTRU may be configured with specific rule(s) to determine whether a carrier can be selected/used for a transmission based on the data rate requirements of a transmission and the sensing/measurement results of an associated carrier, as described herein.

A WTRU may select one or more carriers that can meet the requirements of an associated data rate based on measurements that indicate that such a data rate can be supported.

A WTRU may select a carrier based on measurements that indicate that an associated data rate can be met with the available resources. For example, a WTRU may select a carrier based on one or more of the following measurements on the carrier.

The WTRU may select a carrier based on resource occupancy on that carrier (e.g., based on a channel busy ratio or CBR). The WTRU may select a carrier based on the ratio of reserved/available resources over a future time period, whereby such a future time period may depend on a QoS characteristic of the transmission. The WTRU may select a carrier based on a measured number/ratio of available resources that may comprise a certain number of contiguous (e.g., in time and/or frequency) resources. For example, the WTRU may measure the ratio of available resources that have at least x contiguous subchannels associated with them. The value of x may be configurable. The WTRU may select a carrier based on CSI associated with the resources of the carrier.

In examples (e.g., when a WTRU has a transmission associated with one or more SLRBs with a data rate of x), a WTRU may select a carrier for the transmission if the ratio of available resources (e.g., as indicated by sensing/measurement results) on that carrier is at least y. The WTRU may be configured, for example, with a table that maps the values of x to y.

In examples (e.g., when a WTRU has a transmission associated with one or more SLRBs with a data rate of x), a WTRU may select a carrier for the transmission if the SLRB(s) have a measured CBR that is below a configured threshold. The threshold may depend on x.

A WTRU may selects one or more carriers to avoid impacting other WTRUs. A WTRU may select a carrier based on QoS measurements of other WTRUs that may be detected on that carrier. Such detection may be performed, for example, based on (e.g., by decoding) sidelink control information (SCI) transmitted by the other WTRUs announcing future transmissions. The WTRU may select the carrier(s) such that high rate transmissions may not impact other WTRUs that also use the carrier. The WTRU may use a combination of criteria to select/not select a carrier for a transmission. A configured parameter in the criteria may depend on the relevant data rate. For example, the WTRU may select a carrier based on a configured number of WTRUs having QoS parameter(s) that meet pre-configured criteria (e.g., detection of at least x WTRUs having latency/priority of transmission smaller than a value of y).

A WTRU may be configured to perform carrier/resource reselection based on one or more rate-related triggers (e.g., triggers related to the rate of transmission). For example, such triggers may be based on the WTRU determining that attempts to meet the rate requirements associated with a transmission have failed. The triggers may include one or more of the following.

The triggers may include a change in the measurement of achievable data rates on a carrier. For example, a WTRU may perform carrier/resource reselection when it determines that the achievable data rate on a carrier on which the WTRU is performing a rate-related transmission has fallen below a threshold or has been reduced by a certain threshold. A WTRU may perform carrier/resource reselection when it determines that the achievable data rate on a carrier has changed by at least a certain amount from an initial value (e.g., an initial value determined at SLRB establishment or modification). Such an initial amount may be determined based on a configuration and/or the value of the achievable data rate itself. A WTRU may perform carrier/resource reselection when it determines that the difference between the achievable data rate and the total required data rate of one or more (e.g., all) SLRBs has changed by a certain amount.

The triggers may include a change in the number of active transmissions (e.g., SLRBs) associated with a rate requirement. The triggers may be based on that a computed aggregated transmission rate requirement has changed by a certain amount. For example, a WTRU may perform carrier/resource reselection following the initiation of a SLRB having a specific rate requirement.

The triggers may include a change in the measured quality of carrier(s) and/or resource(s) used by a WTRU to perform transmissions (e.g., transmission having a certain associated data rate). For example, a WTRU may perform carrier/resource reselection following a determination that the measured and/or reported quality of a set of resources has changed by a certain amount.

The triggers may include a change in the profile of QoS properties being used by other WTRUs (e.g., as detected via sensing/measurement). For example, a trigger may be based on a change in the number of WTRUs having certain QoS properties on the carrier exceeding a certain amount.

The triggers may include a failure or error condition detected during a LCP procedure. For example, a WTRU may determine that the number of resources associated with one or multiple sidelink processes is too large or too small to satisfy the data rate requirements of a set of SLRBs. The WTRU may make such a determination based on the results of a LCP procedure applied to the grants of the one or multiple sidelink processes. The WTRU may make such a determination based on the amount of data in a buffer associated with a LCH (e.g., a LCH explicitly configured with a data rate requirement). The WTRU may perform resource reselection when one or more of the following are satisfied.

The WTRU may perform resource reselection when the value of a bucket or buffer size parameter (e.g., Bj or a similar bucket or buffer size parameter) associated with one or more LCHs remains positive or negative for a configured or predefined period of time.

When referred to herein, the terms bucket size may represent an amount of data to be transmitted (e.g., at an instance of channel prioritization, such as logical channel prioritization). For example, the term bucket size may represent the amount of data to be transmitted (e.g., at an instance of logical channel prioritization) for a given logical channel (e.g., logical channel j), for example, to meet a bit rate requirement (e.g., prioritized bit rate requirements) of that logical channel. Bj may represent a bucket size for a channel j (e.g., logical channel j). In examples, the bucket size or Bj (e.g., for logical channel j) may be determined based on a prioritized bit rate (PBR) and a bucket size duration (BSD) associated with the logical channel (e.g., based on the product of PBR and BSD, or PBR×BSD). The value of bucket size or Bj may change with time, for example, as data associated with the logical channel is transmitted using a grant. In examples, Bj>0 at a given time may indicate that there is prioritized data in a bucket of the logical channel and/or that a grant should be used to transmit the prioritized data for the logical channel (e.g., in order to meet a data rate requirement for the logical channel). Bj<=0 may indicate that a data rate requirement associated with the logical channel has been satisfied.

The WTRU may perform resource reselection when the value of a bucket size parameter (e.g., Bj or a similar bucket size parameter) associated with one or more LCHs exceeds or is smaller than a configured or predefined threshold.

The WTRU may perform resource reselection when the value of a bucket size parameter (e.g., Bj or a similar bucket size parameter) for one or more logical channels has increased over a configured or predefined number of LCP procedures or over a preconfigured or predefined time window.

The WTRU may perform resource reselection when the amount of increase in a bucket size parameter (e.g., Bj or a similar bucket size parameter) observed over a number of LCP procedures or over a time window is larger than a configured or predefined amount.

The WTRU may perform resource reselection when pending data from one or more SL logical channels is not included in any SL grant for a configured or predefined period of time.

The WTRU may perform resource reselection when the amount of data in the buffers associated with one or more logical channels (e.g., one or more logical channels associated with a specific data rate requirement) exceeds a threshold. The threshold may be based on or may be derived from one or more of a configuration or predetermination, a configured LCP parameter such as PBR, BSR, etc. for the one or more logical channels, the current size of the grant(s) associated with one or more configured SL processes, the period (e.g., time between successive grants) of one or more SL processes, the maximum allowable size of a grant (e.g., a one-time grant or periodic grants), the number of subchannels in a BWP and/or a carrier or the number of subchannels in a set of BWPs and/or carriers, a measured CBR, or a CQI report from a peer WTRU for a unicast or groupcast link.

A WTRU may perform resource reselection if the amount of data in one or more buffers of a logical channel is larger than k*PBR*BSD, where k may be configured or predetermined (e.g., by the network) and BSD (bucket size duration) may indicate the amount of time during which data associated with a logical channel is buffered at the PBR (prioritized bit rate) until a bucket size associated with the logical channel is reached.

A WTRU may perform resource reselection if the amount of data in one or more buffers of a logical channel is larger than k*M*PBR, where M may represent the total grant sizes of one or more (e.g., all) pending SL grants or processes divided by the total number of logical channels, and k may be configured or predetermined (e.g., by the network).

A WTRU may perform resource reselection if the PBR for a LCH is larger than k*M*f, where M may represent the total or average grant size of one or more periodic SL processes, f may represent the average frequency of one or more SL processes (e.g., how often they occur), and k may represent a configured or predetermined parameter (e.g., by the network).

A WTRU may determine the SL process on which the WTRU may perform resource reselection. A WTRU may perform resource reselection on one or a subset of SL processes following a data rate related reselection trigger. A WTRU may select the one or more SL processes on which resource reselection is performed (e.g., out of a set of configured SL processes) based on one or more of the following rules.

The WTRU may select the SL process(es) with the smallest or largest grant size, or whose grant size has been configured to be associated with the QoS parameters configured for a LCH.

The WTRU may select the SL process whose next configured grant occurs first with respect to a trigger for resource reselection.

The WTRU may select the SL process with the shortest/largest periodicity, or whose periodicity has been configured to be associated with the QoS parameters configured for a LCH.

The WTRU may select the SL process that respects (e.g., complies with) a mapping restriction or mapping preference between logical channels and SL processes. The mapping restriction or preference may be based on the periodicity of traffic associated with a LCH and/or the periodicity of the SL process.

The WTRU may select a SL process such that any increase or decrease in the size of the grant associated with the SL process may not result in the WTRU exceeding the maximum configured grant size of the SL process or falling below the minimum configured grant size of the SL process.

The WTRU may select the SL process that was initiated by the WTRU as a result of the initiation of a LCH or SLRB.

The WTRU may select the SL process whose reselection counter is the smallest or the largest.

A WTRU may select one or more SL processes (e.g., any SL process) to which the LCH that triggered reselection can be mapped. Such mapping may be configured based on the latency associated with the LCH configuration and/or the corresponding periodicities of the one or more SL processes.

A WTRU may trigger resource reselection on multiple SL processes in response to one or more (e.g., any) of the rate-related triggers described herein. For example, a WTRU may determine that performing resource reselection on one sidelink process may cause the WTRU to exceed the maximum reserved/selected data rate. In such case, the WTRU may select one or more other SL processes and perform resource reselection in order to reduce the total amount of reserved/selected resources to be below the maximum reserved/selected data rate. The WTRU may select one or more SL processes associated with the least stringent QoS requirements (e.g., lowest priority) if such an association exists. The WTRU may select one or more SL processes with the largest current reselection counter.

A WTRU may determine whether to maintain reserved resources and the amount of time during which such resources are maintained based on one or more QoS parameters. The WTRU may decide the amount of time for maintaining these reserved resources for a sidelink process based on factors associated with the QoS requirements of one or more SLRBs mapped to the sidelink process. The WTRU may determine the number of periods (e.g., which may correspond to an amount of time) during which a resource should be reserved based on one or more of data rate related parameters, latency related parameters, minimum communication related parameters, a random number selected by the WTRU, a preconfigured value or factor, congestion related parameters (e.g., such as a channel busy ratio), or cast(s) of the SLRBs that are currently operating.

A WTRU may determine a time period during which a set of resources can be reserved for a sidelink process. A WTRU may determine the number of times a set of reserved resources can be repeated for a sidelink process. A WTRU may perform either or both of the foregoing determinations during a resource selection procedure for the sidelink process. A WTRU may perform either or both of the foregoing determinations based on a total maximum rate of reserved resources. A WTRU may be configured with a mapping between a computed maximum rate of reserved resources and a number of repetitions for a SL process. For example, a WTRU may be configured with a mapping between a maximum rate, a CBR, and/or a number of resources that can be reserved during a resource selection procedure for a SL process.

A WTRU may decide whether it can perform resource reselection for a sidelink process based on one or more (e.g., any) of the factors described herein. For example, a WTRU may determine, at the time of resource reselection for one or more SL processes, whether it can reserve resources for a sidelink process based on whether a measured CBR is above or below a configured threshold.

Resource and/or carrier selection/reselection may be performed for unicast communication. For unicast communication, resources may be synchronized between multiple (e.g., two) WTRUs, for example, to avoid half-duplex issues between the WTRUs. A carrier may be synchronized, e.g., since a WTRU may transmit HARQ feedback for another WTRU's transmissions and the data and HARQ feedback may be on the same carrier.

The following may apply to carriers (e.g., in the context of a WTRU operating on multiple carriers) and/or resources. The resources may comprise time/frequency/beam resources. Resource selection may comprise selection of a set of resources (e.g., which may be repeated periodically) within a resource pool. Resource selection may comprise selection of a resource pool or a resource pattern within a set of pools/patterns.

A WTRU in a unicast link may be responsible for resource/carrier reselection. For example, one of two WTRUs may be denoted the responsible WTRU for performing resource/carrier reselection. The responsible WTRU may be determined based on one or more of the following.

The responsible WTRU may correspond to a WTRU configured to perform a specific role in a link establishment procedure. For example, the responsible WTRU may be the WTRU that initiates the link establishment procedure.

The responsible WTRU may correspond to a WTRU having the lowest or highest value of an observed quality metric (e.g., with respect to a resource pool or a set of allowable resources) for unicast. For example, multiple WTRUs may periodically exchange measured CBR and the responsible WTRU may be selected as the WTRU having the lowest or highest CBR.

The responsible WTRU may correspond to a WTRU having the highest or lowest value of a configured or pre-configured parameter or identifier. For example, the WTRU with the highest or lowest L2 ID may be denoted as the responsible WTRU.

The responsible WTRU may correspond to a WTRU having certain coverage characteristics with respect to the network and/or a synchronization source. In examples, a WTRU synchronized to a synchronization source that is closest (e.g., in terms of synchronization levels) to the gNB may be determined as the responsible WTRU. In examples, a WTRU having better Uu RSRP at a given time may be denoted as the responsible WTRU.

A WTRU may perform carrier/resource reselection based on metrics associated with resources used with a peer WTRU. A WTRU may perform resource/carrier reselection based on certain triggers (e.g., which may be related to QoS) related to a peer WTRU and/or triggers related to the resources used for communication with a peer WTRU. A WTRU may perform resource/carrier reselection based on (e.g., as a result of) one or more of the following.

A WTRU may perform resource/carrier reselection based on the reception of an indication or request to perform carrier/resource reselection. A WTRU may transmit/receive a carrier/resource reselection request to/from another WTRU. For example, a WTRU may perform carrier/resource reselection in response to reception of a request from another WTRU. A WTRU may transmit a carrier/resource reselection request to a peer WTRU in response to a change in CBR or a similar measurement of channel occupancy by the WTRU. A WTRU may transmit a carrier/resource reselection request to a peer WTRU based on a counter of how many periodic or non-periodic data/PDUs transmitted by the WTRU reach a pre-configured value. A WTRU may transmit a carrier/resource reselection request to a peer WTRU based on a change in a resource pool configuration at the WTRU. A WTRU may transmit a carrier/resource reselection request to a peer WTRU based on the WTRU not being able to transmit feedback (e.g., HARQ or CSI) to a peer WTRU using currently configured carriers/resources (e.g., due to TX carrier limitation). A WTRU may transmit a carrier/resource reselection request to a peer WTRU in response to data arrival at the WTRU (e.g., the data may have a new/different QoS requirement). A WTRU may transmit a carrier/resource reselection request to a peer WTRU based on any other suitable trigger mentioned herein in association with a data rate.

A WTRU may perform resource/carrier reselection in response to reception of quality information from a peer WTRU, e.g., relating to configured resources and/or carriers for a peer WTRU. A WTRU may perform carrier/resource reselection based on quality information reported by a peer WTRU. A WTRU may transmit quality information such as quality information associated with the resources/carriers configured for usage between the WTRU and a peer WTRU. Such quality information may include CBR measurement(s) and/or a similar measurement of load on a set of resources and/or carriers configured for usage between two WTRUs. Such quality information may include RSRP/RSRQ/CQI/ etc. of a known signal transmitted by a peer WTRU. Such quality information may include measured RSSI of a resource and/or a set of resources on one or more carriers. Such quality information may include HARQ metrics, such as the number of HARQ ACK/NACK per resource or set of resources associated with a carrier.

A WTRU may receive quality information from a peer WTRU and may perform carrier/resource reselection based on such quality information. For example, a WTRU may perform carrier/resource reselection if the CBR reported by a peer WTRU is below a threshold. A WTRU may perform carrier/resource reselection if the measured RSSI on a set of resources reported by a peer WTRU is below a threshold.

A WTRU may perform resource/carrier reselection based on its own measurements of resource quality including the WTRU's own measured quality metrics on a set of resources. Such quality metrics may include CBR measurement(s) or a similar measurement of the load on a set of resources. Such quality metrics may include RSRP/RSRQ/ CQI/etc. of a known signal transmitted by a peer WTRU. Such quality metrics may include measured RSSI of a resource and/or set of resources on one or more carriers. Such quality metrics may include HARQ metrics, such as the number of HARQ ACK/NACK per resource or set of resources associated with a carrier.

A WTRU may perform resource/carrier reselection based on a combination of quality information measured by the WTRU and reported by a peer WTRU. The WTRU may perform carrier/resource reselection based on its own quality metrics and/or quality information reported by a peer WTRU. For example, a WTRU may determine a weighted average of certain quality metrics (e.g., CBR) between its own measured value(s) and value(s) reported by a peer WTRU and may perform resource reselection if the combined average is below a configured threshold.

A WTRU may send an indication of performed carrier/ resource reselection to a peer WTRU. A WTRU may perform carrier/resource reselection, and may send an indication of such selection/reselection to a peer WTRU. The WTRU may send such indication, for example, if the carrier/resource reselection may affect the resources/carriers utilized by the peer WTRU. For example, the WTRU may send the indication if the carrier/resource reselection may affect the resources used by a peer to transmit HARQ feedback, or when common carriers are shared by the two WTRUs.

An indication of carrier/resource reselection may comprise one or more of a set of new carriers/resources selected by a WTRU or a time instant in which the new carrier/ resources may start to be used.

A WTRU may send an indication of carrier/resource reselection using one or more of a SL MAC CE, a SL RRC message, or an indication on a dedicated sidelink physical channel such as an SCI with a specific field (e.g., with the contents of the indication included in a Physical Sidelink Shared Channel or PSSCH).

Logical channel prioritization or LCP may take into account that transmissions can be sent to one or more destinations (e.g., one or more WTRUs). For example, LCP may take data from multiple related destinations to satisfy a grant (e.g., a single grant). A WTRU may be configured with one or more (e.g., a group or a set of) destinations, for example, as an LCP restriction or part of an LCP restriction.

In examples, a WTRU may be configured with one or more (e.g., a group or set of) destination addresses such as L2 destination IDs. These destination addresses may be considered common from the point of view of LCP restrictions. In examples, a WTRU (e.g., a present WTRU) may multiplex PDUs intended for different destination addresses (e.g., different WTRUs connected to the present WTRU via a sidelink) on condition that those destination addresses belong to a group or set (e.g., a configured group or set of destinations or WTRUs). In examples, a WTRU may be configured to not multiplex PDUs intended for destinations that are associated with different groups or sets in the same transmission.

A WTRU may be configured with a group or set of destination addresses in various ways including, for example, upper layer (e.g., RRC) signaling. For example, the WTRU may receive information (e.g., configuration) from an upper layer (e.g., a V2X layer, a non-access stratum or NAS layer, an RRC layer, etc.) regarding L2 destination addresses associated with a group. The WTRU may derive information regarding one or more L2 destination addresses associated with a group based on upper layer signaling (e.g., based on signaling at a V2X layer, a non-access stratum or NAS layer, an RRC layer, etc.).

A WTRU may receive a configuration for a group or set of destination addresses from a network. For example, the WTRU may receive an RRC message from the network with a list of destination addresses that may be related (e.g., the destination addresses may form or belong to a group).

A WTRU may be configured with a group or set of destination addresses implicitly, e.g., based on L2 destination IDs (e.g., bit strings identifying different destination addresses or devices). For example, the WTRU may identify (e.g., determine) one or more WTRUs that may be part of the same group based on a relationship among the L2 destination IDs of such destinations (e.g., based on the destination addresses having a common set of MSBs or LSBs and/or based on some other inspection of the L2 destination IDs). The WTRU may provide such grouping on condition that the L2 destination IDs are associated with unicast and/or groupcast. For example, groupcast destination IDs may be grouped and unicast destination IDs may be grouped. In examples, a groupcast ID may not be grouped with a unicast ID. In examples, a groupcast ID may be grouped with a unicast ID, for example where the unicast ID is associated with a destination that is also associated with the groupcast ID.

In examples, a grant may service (e.g., may designated for) a single destination and this may lead to starvation of lower-priority destinations. For example, this (e.g., resource starvation) may be the case when a destination address having the highest priority data is selected (e.g., to use the grant) and/or when a grant is filled with data associated only with that destination during logical channel prioritization. A WTRU may be configured to select a destination address associated with a grant based on the bucket size(s) (e.g., a bucket size parameter) associated with that destination, e.g., so that a destination may represent a single destination or a set of destinations in accordance with one or more LCP restrictions associated with the set or group of destinations. In examples (e.g., when selecting a destination address for a grant), a WTRU may select multiple destinations if such destinations are associated with a same group. In examples (e.g., when selecting multiple destinations associated with a same group for a grant or when performing destination selection based on the priorities of LCHs), a WTRU may consider multiple (e.g., all) LCHs that are associated with the destinations of a same group together and decide whether the destination or group of destinations should be selected.

A WTRU may select the logical channel(s) to be serviced by a grant (e.g., at the start of an LCP procedure) by determining the prioritized bit rate of one or more (e.g., all) logical channels associated with a destination. For example, a WTRU may select a destination address or a set of destination addresses, and the logical channel(s) associated with the destination address or addresses may be processed based on a measurement of the prioritized bit rate (PBR) and/or a bucket size parameter (e.g., such as the bucket size ($B_j$) associated with logical channel j) of the logical channel (s) associated with the destination address or addresses.

A WTRU may be configured to consider a subset (e.g., only a subset) of logical channels when evaluating the criteria to be used for destination address selection. Such a subset of logical channels may be defined based on a specific QoS requirement (e.g., minimum communication range, priority, latency, etc.). For example, the WTRU may be configured to satisfy one or more criteria when selecting a destination address by considering only the logical channels associated with a specific priority or a specific set of priorities. Such a priority or set of priorities can be provided, for instance, with a grant (e.g., for mode 1), or the priority or set of priorities may be associated with a property of resource selection results (e.g., for mode 2).

In one or more (e.g., any) of the examples given herein, a WTRU may be configured to consider the logical channels that satisfy a certain LCP restriction (e.g., in addition to other criteria specified herein). For example, a WTRU may be configured with an LCP restriction based on a grant type (e.g., a given logical channel may be allowed or disallowed to use grants of a specific type). In these cases, the WTRU may consider the LCHs that are allowed to use a specific type of grants when selecting a destination address (e.g., to use the specific type of grants) and the WTRU may not consider LCHs that are not allowed to use the specific type of grant. For example, when a WTRU is configured to perform destination selection based on a combination of priority and/or PBR (e.g., as described herein), the WTRU may consider the LCHs that are allowed to use a specific type of grants.

A WTRU may select a destination address using one or more of the criteria described herein. For example, a WTRU may select a destination address associated with a logical channel having the highest priority and/or having $B_j>0$. A WTRU may use one or more criteria when selecting a destination address. For example, a WTRU may use a first criteria to select a destination address. If more than one destination address satisfies the first criteria and/or if multiple destination addresses share a same parameter value associated with the first criteria, the WTRU may use a second criteria to select the destination address. If none of the destination addresses satisfy the first criteria, the WTRU may use a second criteria to select the destination address. These rules can be extended (e.g., generalized) to any number of criteria. For example, if more than one destination address satisfies the (n)th criteria, the WTRU may then consider the (n+1)th criteria. Similarly, if the (n)th criteria is not satisfied by any destination address, the WTRU may then consider the (n+1)th criteria.

A WTRU may select a destination address for which $B_j$ (e.g., the bucket size associated with a logical channel with pending data) has the largest non-zero value. If multiple destination addresses are associated with a logical channel having the same $B_j$ value, the WTRU may select the destination address having the highest priority. If multiple destination addresses are associated with respective logical channels (e.g., logical channels with pending data) that have the same $B_j$ value and the same priority, the WTRU may select a destination address (e.g., among the multiple logical channels) such that satisfying the grant with (e.g., using the grant for) the logical channel(s) associated with that destination address will minimize the total amount of data selected for transmission that exceeds the $B_j$ for the logical channel associated with the selected destination address. For example, when multiple destination addresses are associated with respective logical channels that have the same $B_j$ value and the same priority, the WTRU may select a destination address that results in the minimum amount of the grant being used for data transmission that exceeds $B_j$ (e.g., the sum of the data transmitted on each logical channel j that exceeds $B_j$ is minimized).

Figure 2:
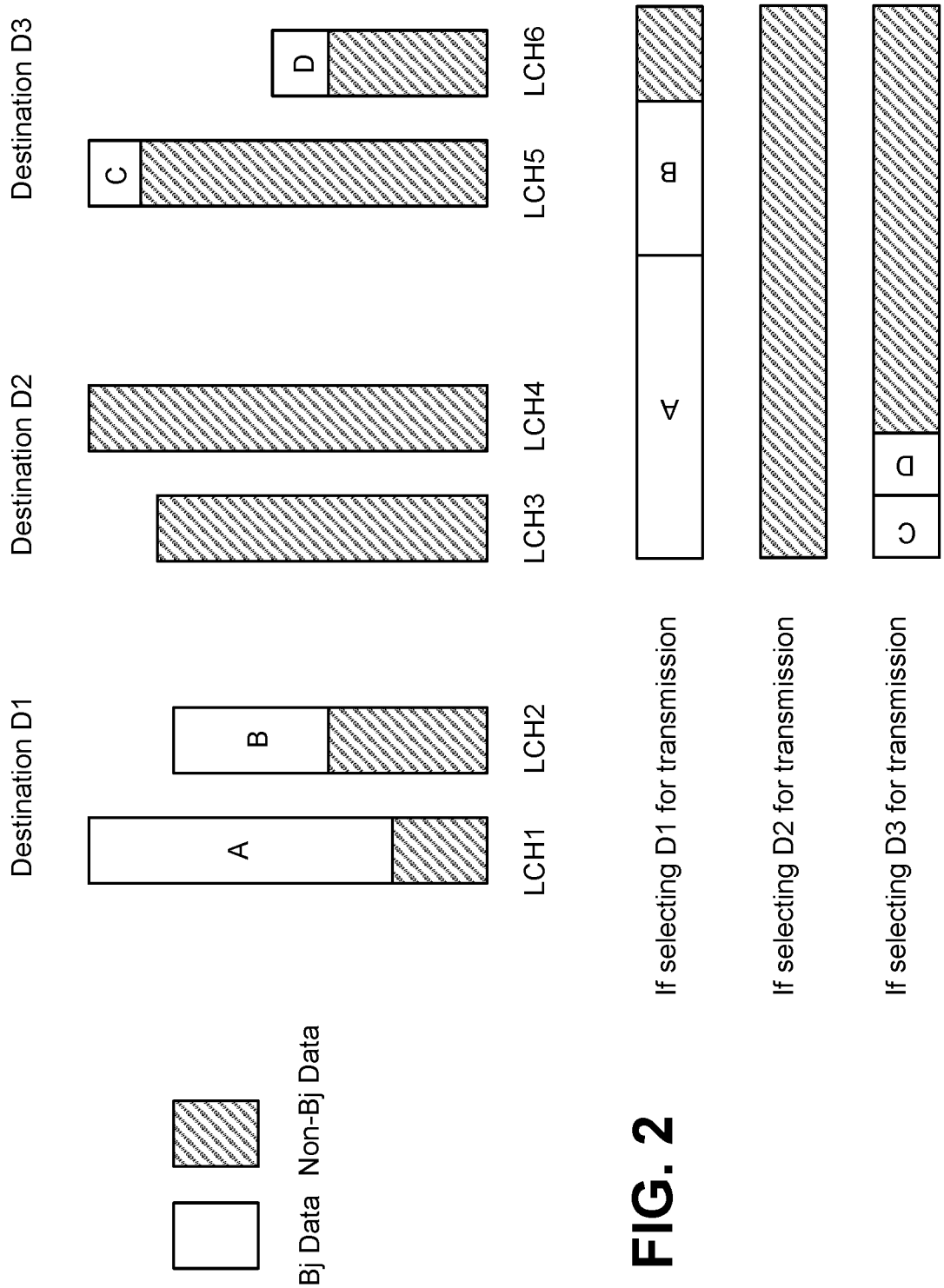
FIG. 2 is a diagram illustrating an example scenario for destination selection.

FIG. 2 illustrates how a WTRU may determine a destination for which a set of sidelink resources (e.g., a grant in Mode 1 or a set of autonomously selected resources in Mode 2) may be used. As shown, the WTRU may have six logical channels, LCH1-LCH6, with available data to transmit. The data associated with each logical channel may include prioritized data (e.g., data that, if transmitted, would satisfy the $B_j$ associated with the logical channel) and/or non-prioritized data (e.g., data that, if transmitted, would exceed the $B_j$ associated with the logical channel) and each of the logical channels may be associated with a destination. For example, LCH1 and LCH2 may be associated with destination D1 and may have both prioritized data and non-prioritized data. LCH3 and LCH4 may be associated with destination D2 and may have only non-prioritized data. LCH5 and LCH6 may be associated with destination D3 and may have both prioritized data and non-prioritized data. In an example situation, the six logical channels may have equal priority, and the WTRU may, in response to determining that the set of sidelink resources have become available, select D1 as the destination for transmission since the transmission to D1 may result in the least amount of grant being used for non-prioritized data (e.g., as compared to the transmission to D2 or D3).

For one or more of the criteria (for determining a destination address) described herein, a WTRU may consider the amount of data it can multiplex from one or more logical channels associated with a destination based on the subset of logical channels that satisfy a specific QoS restriction. For example, when evaluating a criterion that is based on the amount of data multiplexed into a grant for a specific logical channel, the WTRU may consider that only the data restricted by the QoS requirement can be multiplexed into the grant.

A WTRU may select a destination address having the largest or smallest value of a QoS parameter. For example, a WTRU may select a destination address that has pending data and that is associated with a logical channel having the largest or smallest value of a QoS-related parameter. For example, the WTRU may select a destination address associated with a logical channel having the highest priority among a set of logical channels (e.g., among all logical channels) with pending data. For example, the WTRU may select a destination address that is associated with a logical channel having the smallest latency budget. The QoS parameter used for the decision may be configured by an upper layer (e.g., a network or NAS layer). Other QoS parameters including reliability and minimum communication range may also be used for this purpose.

A WTRU may select (e.g., only select) one or more destinations having a bucket size (e.g., Bj) greater than a threshold (e.g., greater than 0). In examples, a WTRU may select a destination address that has at least one logical channel with pending data and with Bj>0. A WTRU may select a destination address associated with the highest priority logical channel. For example, A WTRU may select a destination address associated with the highest priority logical channel in the case of multiple destinations having logical channel(s) with Bj>0.

A WTRU may select one or more destinations having the largest bucket size (e.g., as represented by Bj) for a logical channel. In examples, a WTRU may select a destination address associated with a logical channel that has pending data and the largest bucket size (e.g., as represented by Bj) such that the bucket size is greater than a threshold (e.g., greater than 0). In examples (e.g., in the case of multiple destinations having logical channel(s) with the same bucket size), a WTRU may select the destination with the highest priority logical channel for a given grant.

A WTRU may select one or more destinations that have the largest total bucket size (e.g., as represented by the sum of Bjs) for all or a subset of the logical channels associated with each of the destination(s). In examples, a WTRU may select the destination address having the largest total bucket size (e.g., total bucket size of all logical channels associated with that destination). In examples, a WTRU may select the destination address having the largest total bucket size among all logical channels (e.g., logical channels with pending data) having Bj>0. In examples (e.g., in the case of multiple destinations having the same total bucket size), a WTRU may select the destination with the highest priority logical channel. In examples, a WTRU may select the destination address having the largest total bucket size of the logical channels that share a specific parameter value (e.g., having the same priority). For instance, a WTRU may select the destination address that has the largest total Bj associated with a specific priority. The specific priority may correspond to the priority of the highest priority LCH having data available from a certain destination (e.g., among multiple destinations).

A WTRU may select a destination so that the amount of resource waste associated with a grant may be reduced or minimized. For example, the WTRU may select a destination so that the difference between the size of a grant and the actual buffer size of one or more (e.g., all) logical channels associated with that destination may be reduced or minimized (e.g., in the case where a grant is larger than the total buffer size for the logical channels associated with that destination). In examples (e.g., when there is at least one destination for which the total buffer size is larger than a grant), a WTRU may select any of those destinations.

A WTRU may compare the total buffer size of logical channels associated with each destination and select the destination that has the largest total buffer size.

A WTRU may select a destination that is associated with the highest priority logical channel and that has a bucket size greater than a certain threshold (e.g., with Bj>0). In examples, a WTRU may select the destination address having the highest priority logical channel where Bj>0. The WTRU may, in response to determining that a set of resources are available for the WTRU to perform a transmission, identify one or more logical channels with respective bucket size parameters (e.g., Bj) having a value greater than zero. The WTRU may further identify, from the one or more logical channels, a logical channel that has the highest transmission priority. The WTRU may then select a destination associated with the highest priority logical channel as the destination of the transmission (e.g., as the destination to use the grant). In examples (e.g., in the case of multiple destination addresses being associated with logical channel(s) that have Bj>0 and that have the same priority), a WTRU may select the destination based on one or more of the following.

In examples where multiple destination addresses are associated with logical channel(s) that have Bj>0 and that have the same priority, the WTRU may select the destination in response to determining that the destination is associated with a logical channel with Bj>0, where that specific logical channel has the largest value of Bj among the multiple destination addresses (e.g., among the logical channels associated with the multiple destination addresses).

In examples where multiple destination addresses are associated with logical channel(s) that have Bj>0 and that have the same priority, the WTRU may select the destination in response to determining that the destination has the largest value of total bucket size (e.g., the total bucket size may correspond to a sum of the bucket sizes of all logical channels associated with a destination).

In examples where multiple destination addresses are associated with logical channel(s) that have Bj>0 and that have the same priority, the WTRU may select the destination based on any other of conditions described herein in association with the selection of a destination address (e.g., based on a previous selection, based on PRB, based on bucket size, based on the destination for which the grant can satisfy the largest number of logical channels with Bj>0, etc.).

A WTRU may select a destination based on previous selections. Doing so may ensure that destinations associated with logical channel(s) having Bj>0 be selected fairly. For example, a WTRU may determine a set of destination addresses associated with a logical channel having Bj>0 and may select one or more destinations sequentially (e.g., in a round robin manner) among different initiations of a LCP procedure at grant reception. The sequential selection of destination addresses (e.g., with logical channels having Bj>0) may be weighted to prioritize certain destinations based on one or more of the following.

The weighting may be based on the priority of the logical channel(s) having Bj>0. In examples, destinations with the highest priority logical channels may be serviced first in the sequence of destination addresses. In examples, destinations with the highest priority logical channels may be serviced more often in the sequence of destination addresses.

The weighting may be based on the value of Bj for the logical channel(s) associated with a destination. For example, destinations with the largest Bj or largest total Bj may be serviced first or more often in the sequence of destination addresses.

The weighting may be based on the value of prioritized bit rate (PBR) or total PBR for a destination. For example, destinations with the highest value of PBR for a particular logical channel or the highest value of total PBR (e.g., the sum of PBRs) across multiple (e.g., all) logical channels may be serviced first in the sequence or may be services more often in the sequence.

A WTRU may select a destination based on PBR. For example, a WTRU may select a destination address having the highest PBR of a specific logical channel or the highest total (e.g., sum of) PBR across multiple (e.g., all) logical channels. A WTRU may use such selection criteria under certain conditions (e.g., in the case where two destinations are both associated with logical channel(s) having Bj>0 and/or where two destinations are both associated with logical channel(s) having the highest priority among multiple destinations).

A WTRU may select a destination for which a grant can satisfy the largest number of logical channels (e.g., logical channels with Bj>0). In examples, a WTRU may select a destination address such that a pending grant, when applied to the logical channels associated with that destination, can satisfy the largest number or percentage of logical channels (e.g., logical channels associated with the destination) that have Bj>0 and/or that have a specific priority. For example, a destination address may be selected such that it satisfies the largest number of logical channels having Bj>0 and/or having a priority greater than a specific threshold. For example, a destination address may be selected such that it satisfies the largest number or percentage of logical channels associated with the destination that have Bj>0, where the number or percentage of logical channels are associated with the highest priority among those logical channels whose Bj is greater than 0. For example, a destination having more than one logical channel with Bj>0 may be selected for a specific grant if the grant can satisfy all logical channels with Bj>0 when the grant is used.

A WTRU may select a destination having the largest weighted Bj (e.g., bucket size). The WTRU may apply a weight (k) to the value of Bj associated with one or more logical channels (e.g., with each logical channel) and may select the destination address associated with a logical channel with pending data and having the largest value of k*Bj>0 among all logical channels. The WTRU may select the destination address having the largest total value of k*Bj across all logical channels that have pending data and that are associated with the destination. The WTRU may select the destination address having the largest total value of k*Bj across all logical channels that are associated with the destination and that have Bj>0.

A WTRU may be configured with a weight (k) to be applied to one or more of the logical channels described herein. The WTRU may determine the weight based on one or more of the following.

The WTRU may determine the weight based on the priority or any related QoS parameter of a logical channel. For example, the WTRU may apply a configured weight for a given priority, latency, reliability, minimum communication range, and/or other characteristics of the logical channel.

The WTRU may determine the weight based on the PRB configured for a logical channel. For example, the WRU may determine the weight from the PBR based on a mapping of PBR to weight (k).

The WTRU may determine the weight based on the cast type (unicast, groupcast, broadcast, etc.) associated with the destination. For example, the WTRU may apply a different weight (e.g., configured weight) for one or more cast types (or each cast type).

A WRU may minimize the amount of data transmitted in the grant that exceeds Bj (e.g., minimizing grant usage for non-prioritized data).

A WTRU may select a destination so as to minimize the total amount of data in a grant (e.g., total amount of data transmitted using the grant) that exceeds the respective Bj's of one or more logical channels associated with the destination. For example, the WTRU may, upon selecting a destination, select logical channels to be multiplexed into a grant based on one or more Uu LCP rules (e.g., currently determined or preconfigured LCP rules). Such rules may include, for example, satisfying Bj>0 first, and then filling a grant with pending data from one or more logical channels that exceeds the Bj's of these logical channels (e.g., if the grant allows these actions). The WTRU may select a destination so as to minimize the total amount of data (e.g., data exceeding the non-zero Bj's of one or more logical channels) multiplexed onto a grant (e.g., when the grant is larger than zero). The WTRU may select a destination such that a grant is used predominantly to satisfy the pending data of one more logical channels that is associated with a current bucket size (e.g., such a current bucket size may be preconfigured).

A WTRU may select a destination that satisfies all or a percentage (e.g., a majority) of configured bucket sizes. For example, the WTRU may select a destination such that a received grant can accommodate all or a maximum amount of the data of logical channels having Bj>0. The WTRU may select a destination such that the respective Bj's of all or a percentage of the logical channels with pending data are equal to or less than zero (e.g., Bj<=0) following the performance of a LCP. The WTRU may select a destination for which a grant may accommodate the largest portion of data associated with the bucket sizes of logical channels having pending data. In examples, the WTRU may select a destination such that the total Bj of logical channels with pending data following a LCP and for which Bj is still >0 is minimized. In examples, the WTRU may select a destination such that the total Bj of logical channels with pending data following a LCP and for which Bj is still >0 minimizes the ratio of total Bj to grant size.

A WTRU may select a destination that satisfies a certain percentage (e.g., a majority) of logical channels with pending data. For example, a WTRU may select a destination for which a grant can accommodate a majority (e.g., most) of the pending data of logical channels associated with the destination. The WTRU may select a destination for which all or a majority of the logical channels may have no remaining data following the performance of a LCP. For example, the WTRU may select a destination for which the remaining data on any logical channel associated with that destination is minimized.

A WTRU may select a destination such that the bucket size of one or more logical channels associated with that destination or the total bucket size of all logical channels associated with that destination (e.g., logical channels having pending data) is above a certain threshold. For example, the WTRU may be allowed to select a destination if the total Bj among all logical channels associated with that destination and/or having pending data is above a preconfigured threshold.

A WTRU may select a destination based on a bucket size (or an equivalent metric) associated with the destination address. For example, the WTRU may maintain a variable, Bd, corresponding to the bucket size (e.g., total bucket size of all logical channels) associated with a (e.g., each) destination address. The WTRU may initialize Bd (e.g., to have a value of zero) when a logical channel associated with destination d is initiated. The WTRU may increment Bd by a destination-based PBR*T, where T may represent the time since the last LCP procedure. The WTRU may select the destination address with the largest Bd>0. The WTRU may select the destination address having the highest priority logical channel with pending data and having Bd>0. The WTRU may determine the value of PBR for a specific destination as a function of the configured PBR of one or more (e.g., each) logical channels associated with the destination. The WTRU may be configured with a value of PBR to use for a (e.g., each) destination address.

A WTRU may be restricted from selecting a same destination address successively. The WTRU may select a destination address using one or more of the criteria discussed herein. The WTRU may be configured with a restriction regarding how often or frequently the WTRU may select that same destination address in subsequent (e.g., successive) LCP procedures. Such a restriction may be conditioned on or applied in the scenario where the WTRU is selecting a destination address from multiple destination addresses having Bj>0 or where there are multiple destination addresses that satisfy at least one of the criteria described herein. For example, following the selection of a destination address for a LCP, the WTRU may exclude the selection of the same destination address for the next N LCP procedures and/or grants if there is another destination address satisfying one or more the criteria described herein. The value of N may be configurable and may further depend on one or more of the number of destination addresses configured for transmission by the WTRU, the number of destination addresses associated with a logical channel having Bj>0 at a given time, or the number of destination addresses having one or more logical channels with PDB larger than a threshold.

In examples, a WTRU may, following the selection of a destination address for a LCP, exclude the selection of the same destination for LCP for a certain period of time. The duration of the time period may depend on similar conditions or factors as described above. The exclusion may be applied, for example, if there are one or more other destination addresses that also satisfy the criteria discussed herein (e.g. having Bj>0, etc.)

A WTRU may use a timer for (e.g., associate a timer with) a destination address. The timer may be, for example, a destination starvation avoidance timer. The timer may reflect the amount of time passed since the destination was last selected for a LCP procedure. For example, a WTRU may start a timer for a destination address upon reception of data on a logical channel (e.g., a logical channel having Bj>0) associated with the destination address. The WTRU may select the destination address (e.g., select the destination address again) when the timer associated with that destination address expires.

A WTRU may determine which decision criteria to use or the order in which these criteria should be used for destination address selection based on channel conditions. For example, one measure of such channel conditions may be the channel busy ratio of a sidelink (SL). A WTRU may select a destination address based on priority (e.g., based on the destination having the highest priority logical channel) when the channel busy ratio of a SL is above a threshold. The WTRU may select a destination based on a logical channel having the largest Bj>0 when the channel busy ratio is below a threshold. The WTRU may use one or more other criteria discussed herein for destination selection based on channel conditions.

A WTRU may determine which decision criteria to use or the order in which these criteria should be used for destination address selection based on which decision criteria are more critical at the time of a LCP. Such criticality may be determined based on the associated value of a parameter used for the selection. For example, the WTRU may use one or more criteria associated with a total Bj (e.g., with a value greater than zero) for destination selection when a measured value of the total Bj for a destination is larger than a certain threshold. The WTRU may use one or more criteria associated with the largest Bj (e.g., with a value greater than zero) for a single logical channel when a measured value of the total Bj for a destination is equal to or smaller than the threshold. For example, the WTRU may use the priority of a logical channel as criteria for determining a destination address if at least one logical channel has data pending with a priority above a certain threshold, and the WTRU may use another criteria for determining a destination address if no logical channel has pending data with a priority above the threshold. A WTRU may use one or more other criteria discussed herein for destination selection based on the criticality of the criteria.

A WTRU may be configured with one or more destination addresses that should be given a higher priority or weight when being considered for destination selection under any of the decision criteria discussed herein. For example, the WTRU may be configured to apply an offset to one or more decision criteria values (e.g., Bj, priority, etc.) when comparing different destination addresses using the decision criterial. To illustrate, the WTRU may be configured to select one destination over another when the two destinations both satisfy a specific criteria or both have the same value of a specific metric (e.g., Bj, priority, etc.). In examples, the destinations given higher priority may be those associated with a specific cast. For example, a WTRU may prioritize destination addresses associated with unicast over those associated with groupcast or broadcast.

A WTRU may use a combination of criteria for destination selection.

In examples, a WTRU may select a destination address that has the highest priority logical channel with data available in the WTRU's buffers and for which the current value of Bj is >0. In examples (e.g., if there are no LCHs having Bj>0), a WTRU may select the destination address that has the highest priority LCH. In examples (e.g., if there are multiple destination addresses with Bj>0 and where the highest priority LCH is the same for the multiple destination addresses), a WTRU may select the destination that may minimize the amount data (e.g., data transmitted using a grant) exceeding Bj, or the WTRU may select the destination for which the total Bj is the largest (e.g., for the highest priority), as described herein.

In examples, a WTRU may select the destination having the highest priority LCH. If multiple destinations have the same highest priority LCH, the WTRU may select the destination with the largest value of Bj associated with that destination address. These selection techniques may be used in conjunction with the other techniques described herein (e.g., for the case when there are no LCHs having Bj>0).

A WTRU may perform one or more of the following operations after destination selection. The WTRU may perform an NR Uu-based LCP procedure across the logical channels associated with the selected destination. For example, the WTRU may attempt to satisfy the logical channels having Bj>0 in a decreasing priority order. A WTRU that selects a destination group, as described herein, may perform such an LCP procedure across one or more (e.g., all) logical channels of the destinations that are associated with the destination group. For example, the WTRU may satisfy the logical channels with Bj>0 in one or more (e.g., all) destinations associated with the selected logical channel group in a decreasing priority order (e.g., across all logical channels in the selected destination group).

A WTRU may be configured to adjust one or more parameters or behaviors such as those associated with starvation avoidance based on a congestion condition. For example, the WTRU may adjust parameters and/or behaviors related to LCP based on a measured congestion condition of a sidelink (e.g., using a channel busy ratio or CBR). Starvation avoidance may refer to rules, operating parameters, behaviors, efforts, etc. applied by a network and/or a WTRU so that the WTRU may avoid or mitigate shortage of resources for sending or receiving a transmission.

A WTRU may be configured to change and/or alternate configured values of one or more of the following parameters based on the presence of congestion and/or the level of congestion associated with sidelink resources. These parameters may include, for example, the prioritized bit rate (PBR) for one or more logical channels, the bucket size duration (BSD) for one or more logical channels, and/or a bucket size parameter (e.g., Bj and/or a similar bucket size parameter).

A WTRU may be configured with different values of PBR for a given logical channel (e.g., depending on a measured congestion level). For example, the WTRU may be configured to apply a first PBR for a logical channel when the measured CBR meets a first criteria (e.g., when the measured CBR is within a first configured range of CBRs), and may apply a second PBR for a logical channel when the measured CBR meets a second criteria (e.g., when the measured CBR is within a second configured range of CBRs).

A WTRU may be configured to operate in one or more of the following ways (e.g., to modify one or more LCP related behaviors) based on a congestion condition. The WTRU may decide whether to select an amount of data based on Bj in accordance with a CBR. The WTRU may decide to perform or skip starvation avoidance during LCP depending on a measured congestion condition. For example, if the measured congestion condition meets a first criteria (e.g., a measured congestion level is within a first configured range of CBRs), the WTRU may perform LCP by selecting an amount of data from a selected logical channel up to the value of Bj. If the measured congestion condition meets a second criteria (e.g., a measured congestion level is within a second configured range of CBRs), the WTRU may perform LCP by selecting available data (e.g., all the available data if there is enough space in a corresponding grant) for a selected logical channel. The WTRU may determine whether or not to select an amount of data based on Bj in accordance with the specific logical channel involved. For example, the WTRU may be configured with separate ranges of CBRs within which the WTRU may perform starvation avoidance (e.g., selecting data based on Bj) or not perform starvation avoidance (e.g., selecting data up to the entire amount of data available for a logical channel). Based on the configuration, the WTRU may (e.g., for a specific instance of LCP and/or a specific measured CBR) decide to select data based on Bj for a first logical channel and not select data based on Bj for a second logical channel.

A WTRU may decide whether to consider Bj in destination address selection based on a CBR. A WTRU may start/stop consideration of Bj, e.g., for a subset of logical channels, during destination address selection depending on a measured congestion level. For example, in conditions of high congestion (e.g., above a certain threshold), the WTRU may perform LCP by selecting a destination with the highest priority. In conditions of low congestion, the WTRU may perform LCP by selecting a destination with the highest priority and Bj>0. The WTRU may perform LCP by selecting a destination with the highest priority and Bj>0 under similar conditions for starvation avoidance, as discussed herein. The WTRU may consider whether Bj is greater than 0 for some logical channels, and my not consider whether Bj is greater than 0 for other logical channels. The WTRU may determine whether or not to consider Bj>0 base on the level of congestion. For example, the WTRU may be configured with a per logical channel congestion threshold for determining whether and/or when to start/stop consideration of Bj>0 during destination address selection.

A WTRU may decide whether to increase Bj depending on a measured congestion condition. A WTRU may start, stop, or pause bucket size (e.g., Bj) calculation and/or accumulation depending on a measured congestion condition. For example, the WTRU may freeze the value of Bj (e.g., not calculating and/or accumulating Bj value) when congestion increases (e.g., when a congestion level moves from below a configured threshold to above the configured threshold, or from one configured range to another range). The WTRU may continue Bj calculation when congestion decreases.

A WTRU may compute Bj differently depending on congestion conditions. A WTRU may compute its bucket size (e.g., Bj) differently depending on a measured congestion condition. For example, the WTRU may be configured with an offset and/or a multiplication factor that the WTRU may apply in the calculation of Bj, for example, when a measured congestion level satisfies certain rules and/or conditions (e.g., when the congestion level is within a configured range of CBRs).

A WTRU may select an amount of data as a function of Bj. Such a function may depend on a measured congestion condition. A WTRU may continue to apply starvation avoidance and/or computation of Bj according to a PBR. The WTRU may consider a modified value of Bj that may depend on congestion conditions. For example, the WTRU may consider (e.g., only consider) data up to a certain percentage of Bj, where such percentage may depend on (e.g., may vary based on) a congestion level and/or a specific logical channel. For example, the WTRU may be configured (e.g., for each logical channel) with a percentage of Bj for selecting an amount of data, where the percentage may depend on a measured CBR.

A WTRU may be configured to determine and/or change SLRB configuration (e.g., such as a RLC mode) based on a CBR.

A WTRU may be configured with a CBR-dependent configuration that corresponds to a QoS flow or QoS profile. The WTRU may change a SLRB configuration based on a measured CBR. For example, the WTRU may be provided with a different configuration of some or all parameters associated with a SLRB for a (e.g., each) range of measured CBR. The WTRU may change a SLRB configuration when a measured CBR changes from one range to another.

A WTRU may be configured with different values of one or more of the following parameters, e.g., based on a measured CBR. For example, the WTRU may be configured to operate in a different RLC mode based on a measured CBR (e.g., high CBR corresponds to an RLC unacknowledged mode (UM), low CBR corresponds to an RLC acknowledged mode (AM), etc.) The WTRU may be configured to determine and/or use a polling retransmission timer value (e.g., T-pollRetransmit timer value) based on a measured CBR. The WTRU may be configured to determine and/or use a maximum retransmission threshold (e.g., MaxRetxThreshold) based on a measured CBR. The WTRU may be configured to determine and/or use a prohibit timer value (e.g., T-statusProhibit timer value) based on a measured CBR. The WTRU may be configured to determine and/or apply a LCH priority based on a measured CBR. The WTRU may be configured to determine and/or apply a ConfiguredGrantType1Allowed value based on a measured CBR. The WTRU may be configured to determine and/or apply a PDCP discard timer value based on a measured CBR. The WTRU may be configured to determine and/or apply a PDCP T-reordering timer value based on a measured CBR.

A WTRU may select a resource pool during a mobility event (e.g., such as during handover). A WTRU may determine the condition(s) for using an exceptional resource pool. When used herein, the term exceptional resource pool may refer to a certain resource pool that is utilized when certain conditions (e.g., atypical or exceptional conditions) are satisfied. For example, a WTRU may determine whether to move Mode 1 transmissions (e.g., transmissions associated with LCHs in Mode 1) during exceptional cases (e.g., during RLF, beam failures, mobility events, etc.) to an exceptional resource pool (e.g., use Mode 2 transmissions on the exceptional resource pool) based on one or more of the following conditions.

A WTRU may determine whether or not to use an exceptional resource pool based on the QoS of data in the WTRU's buffers that is associated with Mode 1 transmission. For example, a WTRU may use an exceptional resource pool for transmissions associated with a subset of logical channels. The subset of logical channels may be determined based on the configuration of parameters associated with those logical channels (e.g., whether the use of an exceptional pool is allowed for the logical channels). The subset of logical channels may be determined based on the QoS associated with those logical channels (e.g., PQI/PFI, MCR, GBR, etc.)

A WTRU may determine whether or not to use an exceptional resource pool based on the presence or configuration of resources for Mode 2 transmission. For example, a WTRU may use an exceptional resource pool for transmissions associated with Mode 1 if the WTRU is not configured with a resource pool for Mode 2 transmissions and/or if the WTRU is not allowed to perform Mode 2 transmissions. A WTRU may use an exceptional resource pool for transmissions associated with Mode 1 if one or more Mode 2 resource pools are configured for transmissions that satisfy the QoS of one or more corresponding LCHs (e.g., if the LCHs are not restricted to using Mode 2 resource pools).

A WTRU may determine whether or not to use an exceptional resource pool based on the type of beam failure recovery (BFR) initiated (e.g., based on whether the BFR is contention-based or contention free). For example, a WTRU may be configured to use an exceptional resource pool for transmissions associated with Mode 1 when a beam failure occurs and beam failure recovery is a contention-based.

A WTRU may determine whether or not to use an exceptional resource pool based on the amount of time expired since beam failure recovery was triggered. For example, a WTRU may be configured to use an exceptional resource pool for transmissions associated with Mode 1 when a beam failure recovery timer reaches a certain time following a number of beam failure recovery attempts.

A WTRU may determine whether or not to use an exceptional resource pool based on the congestion level (e.g., as indicated by CBR) of an exceptional resource pool. For example, a WTRU may be configured to use an exceptional resource pool for transmissions associated with Mode 1 when the CBR of that exceptional resource pool is below a certain threshold.

The conditions described above for selecting and/or using an exceptional resource pool can be combined (e.g., selection/use of an exceptional resource pool may be based on a combination of conditions). For example, the condition for using an exceptional resource pool in one option may depend on parameters associated with another option. For example, a WTRU may use an exceptional resource pool when contention-based BFR is triggered (e.g., a first condition) and the LCHs associated with Mode 1 transmissions are part of a subset of logical channels allowed to used such a pool (e.g., a second condition). The LCHs associated with Mode 1 transmission that are part of the subset of channels to use such a pool may be determined based on QoS of the LCHs. A WTRU may use an exceptional resource pool after a specific amount of time has passed since BFR was triggered, where the specific amount of time may depend on the LCHs configured or the LCHs that have data available in the WTRU's buffers.

Resource/carrier selection/reselection may be performed by a WTRU despite the WTRU having limited TX capability.

A WTRU may support a minimum communication range. A WTRU may be allowed to transmit data in accordance with a minimum communication range (e.g., a minimum required communication range) specific to the data. The examples are described herein in the context of sidelink, but may generally be applicable to any other scenario where a minimum communication range (MCR) requirement exists.

A WTRU may select at least one parameter for transmission of data over a sidelink channel (e.g., PSSCH). The at least one parameter may include a frequency allocation, a time allocation, a modulation and coding scheme, a rank, a number of repetitions (or a maximum thereof), HARQ information, and/or the like. The at least one parameter may include a transmission power level, a transmit antenna gain, and/or an effective isotropic radiated power (EIRP). At least one of the above parameters may be configured or directly indicated by downlink control information (e.g., in network scheduled mode, e.g., Mode 1). For at least one of the above parameters, the WTRU may be configured to select from a plurality of candidate values or candidate combinations of values (e.g., in case of more than one parameter). A subset of possible values may be configured as a range or as an explicit list.

A minimum communication range level may be mapped to a minimum communication range (e.g., a minimum required communication range). A WTRU may have data available for transmission. From the MAC sub-layer perspective, such data may comprise a set of MAC SDUs from at least one logical channel. Higher layers may configure or provide a minimum communication range (e.g., a minimum required communication range) for one or more logical channels (e.g., for each logical channel) and/or for one or more MAC SDU (e.g., for each individual MAC SDU). A minimum communication range (e.g., a minimum required communication range) value (e.g., which may be expressed in meters) may be mapped to one of a finite set of minimum communication range levels, for example, according to a pre-defined or configured rule or formula. Each such minimum communication range level may be represented by an index and may be associated with a path loss value (e.g., in dB units) pre-defined or configured by higher layers. Such path loss value may represent a path loss to a device that is not expected to be exceeded (e.g., with a high probability such as a 99% probability of not being exceeded) when the device is at a distance corresponding to the minimum communication range, e.g., based on an applicable propagation models.

As referred to herein, the acronym MCR may refer to a minimum communication range level or directly to a minimum communication range (e.g., a minimum required communication range), unless otherwise specified. As referred to herein, a minimum communication range may correspond to a specific minimum communication range associated with a transmission. A minimum communication range may be tied to a logical channel. A minimum communication range may refer to a range of values for a minimum communication range. For example, a network may configure a logical channel in a WTRU with a set of minimum communication range values. Such a set of values may be a continuous set of minimum communication range values from a lower bound minimum communication range to an upper bound minimum communication range. When referred to herein, a minimum communication range may correspond to a specific value of minimum communication range or a configured set of minimum communication range values associated with a transmission, a logical channel, a SLRB, and/or the like.

Different transmissions may be suitable for different minimum communication ranges. Logical channel prioritization (LCP) may be performed according to one or more LCH restrictions based on the suitability of a transmission to a minimum communication range.

A WTRU may determine, for a given transmission (e.g., a PSSCH transmission), the suitability of the transmission for one or more minimum communication ranges (e.g., for each minimum communication range). When performing logical channel prioritization, a WTRU may multiplex data or select a logical channel associated with a minimum communication range for which the transmission is determined to be suitable.

The suitability of a transmission to a minimum communication range may be determined according to one or more of the following. Suitability may be obtained from downlink control information (e.g., in network scheduled mode, e.g., Mode 1), e.g., along with other grant parameters. For example, a WTRU may receive the highest minimum communication range for which the grant is suitable via downlink control information. The information may be provided explicitly in a field of DCI or implicitly (e.g., from the search space in which the PDCCH is decoded or from an RNTI value).

Suitability may be calculated based on one or more grant parameters and/or associated power parameters. For example, a WTRU may calculate a maximum achievable path loss based on a transmit power level, antenna gain, and/or other parameters used in an existing power control formula such as the bandwidth (e.g., a number of resource blocks), the number of code blocks, and so on. Additional parameters may be configured for this purpose. In examples, the maximum achievable path loss may be obtained and a WTRU may determine that a grant is suitable for a minimum communication range if the maximum achievable path loss is higher than the path loss value associated to this minimum communication range. In examples, a WTRU may calculate (e.g., directly calculate) an expected maximum distance from a formula. The WTRU may determine that a transmission is suitable if the expected maximum distance is above the minimum communication range (e.g., the minimum required communication range).

A WTRU may be configured to select a combination of grant parameters from a table. One or more elements (e.g., each element) of the table may be configured with a minimum value of transmission power or an effective isotropic transmission power for a (e.g., each) MCR. A WTRU may determine that a transmission using a combination of grant parameters as per an entry of the table is suitable for a minimum communication range if the transmission uses a transmission power (e.g., an effective isotropic transmission power) above a corresponding configured minimum value.

A maximum communication range may be defined/utilized. Such a maximum communication range may be defined in place of or in addition to the minimum communication range described herein. The examples described herein in the context of a minimum communication range may be similarly applied to a maximum communication range. For example, where the suitability is determined by calculation, a grant may be deemed suitable if a maximum achievable path loss is lower than the path loss corresponding to a maximum communication range level.

A WTRU may restrict or prioritize transmissions associated with a minimum communication range (e.g., MCR) that falls within the communication range of a selected LCH (e.g., a first selected LCH). For example, the WTRU may restrict or prioritize the multiplexing of SDUs associated with similar minimum communication ranges when performing a LCP. The set of minimum communication ranges to be multiplexed may be relative to the minimum communication range of the first logical channel selected for transmission. The WTRU may select the first logical channel based on one or more of the criteria discussed herein (e.g., priority, Bj>0, etc.). Following the selection of the first logical channel, the WTRU may be restricted to selecting or may prioritize the selection of logical channels that have similar minimum communication ranges as the first logical channel. For example, the WTRU may be configured with a set of minimum communication ranges (e.g., for each LCH) and may select (e.g., only select) logical channels whose minimum communication range or minimum communication ranges fall within the configured set of minimum communication ranges while using other criteria (e.g., such as priority) for destination selection. The following examples illustrate how a WTRU may determine whether a LCH is within the range of another LCH.

A WTRU may be configured with a set of minimum communication range values (e.g., for each logical channel), where the set of minimum communication range values may comprise a lower bound minimum communication range and an upper bound minimum communication range. The minimum communication range may correspond to a range of distances that include the minimum communication range requirements (e.g., specific minimum communication ranges) of one or more (e.g., all) QoS flows mapped to a corresponding SLRB. For example, the WTRU may be configured with a minimum communication range [A B], where [A B]=[50m 500m]. The WTRU may multiplex QoS flows with minimum communication range requirements that fall within the configured range (e.g., a minimum communication range requirement of 100m would fall within the configured range of [50m 500]) for a SLRB. A LCH may include QoS flows with minimum communication range requirements that fall within the range configured for the LCH. Once a first logical channel is selected, the WTRU may determine that a second logical channel is within the minimum communication range or minimum communication ranges of the first logical channel based on one or more of the following.

The WTRU may determine whether the minimum communication range of a second logical channel overlaps with the minimum communication range of a first logical channel. For example, if LCH1 is configured with a minimum communication range of [A,B] and LCH2 is configured with a minimum communication range of [C,D], then LCH2 may be allowed to be multiplexed or prioritized if $A<=C<=B$ or $A<=D<=B$.

The WTRU may determine that a second logical channel is within the minimum communication range of a first logical channel if the amount of overlap between the two minimum communication ranges associated with the first and second logical channels (e.g., as described above) is larger than a threshold.

The WTRU may determine that a second logical channel is within the minimum communication range of a first logical channel if the distance between the respective minimum communication ranges of the second logical channel and the first logical channel is below a threshold (e.g., a preconfigured threshold). The distance between these minimum communication ranges may be measured as the distance between the lower bounds (e.g., the distance between A and C in the example above), as the distance between the upper bounds (e.g., the distance between B and D in the example above), as the distance between two edges (e.g. the distance between B and C if $B<C$, or the distance between D and A if $D<A$ in the example above), or as the distance between the midpoints of the ranges (e.g., the distance between the midpoint of A and B and the midpoint of C and D in the example above).

The WTRU may determine that a second logical channel is within the minimum communication range of a first logical channel if the respective minimum communication ranges of the two LCHs share at least one common endpoint (e.g., $A=C$ or $B=D$ in the example above).

The WTRU may determine that a second logical channel is within the minimum communication range of a first logical channel if the minimum communication range of the second LCH falls completely inside the minimum communication range of the first LCH (e.g., $A<=C$ and $D<=B$ using the example above, etc.).

An LCH may be configured with a list of allowable minimum communication range values (e.g., in addition to or in lieu of a range). For example, an LCH may be configured with a list of minimum communication range values. Such a list of minimum communication range values may correspond to the set of minimum communication range requirements (e.g., specific minimum communication range values) for one or more (e.g., all) QoS flows mapped to a corresponding SLRB. A WTRU may be configured with a list of minimum communication range values such as (10m, 100m, 200m). The WTRU may multiplex QoS flows with a minimum communication range requirement that matches one or more (e.g., any) of the listed values. The WTRU may select a first logical channel and may determine that a second logical channel is within the minimum communication range of the first logical channel based on one or more of the following.

The WTRU may determine that the second logical channel is within the minimum communication range of the first logical channel if a (e.g., any) value in the list of minimum communication range values for the first logical channel matches a value in the list of minimum communication range values for the second logical channel.

The WTRU may determine that the second logical channel is within the minimum communication range of the first logical channel if at least x minimum communication range values (e.g., x can be preconfigured or predetermined) for the first logical channel match corresponding x minimum communication range values configured for the second logical channel.

The WTRU may determine that the second logical channel is within the minimum communication range of the first logical channel if at least one value in the list of minimum communication range values for the second logical channel is numerically between two minimum communication range values configured for the first logical channel.

The WTRU may determine that the second logical channel is within the minimum communication range of the first logical channel if at least one value in the list of minimum communication range values for the second logical channel is a distance, y, away from at least one value in the list of minimum communication range values for the second logical channel, where y is below a threshold (e.g., a preconfigured threshold).

The WTRU may determine that the second logical channel is within the minimum communication range of the first logical channel if multiple (e.g., all) minimum communication range values in the list of minimum communication range values for the first logical channel match corresponding minimum communication range values (e.g., all of the minimum communication range values) for the second logical channel.

The WTRU may determine that the second logical channel is within the range of minimum communication range of the first logical channel if the minimum communication range values configured for the second logical channel is a subset of the minimum communication range values configured for the first logical channel.

A WTRU may assign an associated minimum communication range for a grant, e.g., upon selection of a first LCH. The associated minimum communication range may be the lower bound minimum communication range value in the set of minimum communication range values configured for that LCH. The associated minimum communication range may be the upper bound minimum communication range value in the set of minimum communication range values configured for that LCH. The associated minimum communication range may be the midpoint minimum communication range value of the set of minimum communication range values configured for that LCH. The associated minimum communication range may be any minimum communication range value within the set of minimum communication range values configured for the LCH.

A WTRU may determine that a second LCH can be multiplexed into a PDU (e.g., a PDU comprising data from a first LCH) if one or more of the following are within a distance x (e.g., x may be preconfigured or predetermined) of an assigned minimum communication range for the grant. For example, the WTRU may determine that the second LCH can be multiplexed into the PDU if the upper bound of the minimum communication range values of the second LCH is within distance x of the assigned minimum communication range for the grant. The WTRU may determine that the second LCH can be multiplexed into the PDU if the lower bound of the minimum communication range values of the second LCH is within distance x of the assigned minimum communication range for the grant. The WTRU may determine that the second LCH can be multiplexed into the PDU if the midpoint of the minimum communication range values of the second LCH is within distance x of the assigned minimum communication range for the grant. The WTRU may determine that the second LCH can be multiplexed into the PDU if any value within the minimum communication range values configured for the second LCH is within distance x of the assigned minimum communication range for the grant.

A WTRU may be configured with a set of allowable or possible minimum communication range values. Once the WTRU selects a first LCH, the WTRU may identify one of the allowable or possible values based on the minimum communication range(s) of the LCH. The WTRU may then be restricted to or may prioritize LCHs that are associated with the identified allowable or possible range (e.g., as identified based on the first selected LCH). The WTRU may identify or associate an allowable or possible range with a LCH based on one or more of the following.

The WTRU may identify or associate an allowable or possible range with a LCH based on whether a minimum communication range, set of minimum communication range values or list of minimum communication range values associated with the LCH falls within the allowable configured range. For example, a configured allowable range may be [50 m 100 m] and a LCH associated with a minimum communication range of [60 m 80 m] would be associated with such a range.

The WTRU may identify or associate an allowable or possible range with a LCH based on whether one or more elements in the list of configured minimum communication ranges for the LCH fall within the configured allowable range.

The WTRU may identify or associate an allowable or possible range with a LCH based on whether there is an overlap between the configured allowable minimum communication range and the minimum communication range(s) configured for the LCH, as described herein.

A WTRU may continue LCP by selecting LCHs (e.g., selecting only those LCHs) that are in the range of a first LCH. Comparison may be made between the LCH being considered and the first LCH selected. In examples (e.g., at the selection of each LCH), a WTRU may consider one or more (e.g., all) LCHs selected up to that point to decide whether a LCH being considered can be included in a PDU. For example, the WTRU may include an LCH if it is within the range of one or more (e.g., any) already selected LCHs based on the rules illustrated in the examples above. The WTRU may include an LCH if it is within the range of one or more (e.g., at least x, where x may be preconfigured) already selected LCHs based on the rules illustrated in the examples above.

The WTRU may first select logical channels that fall within a certain set of minimum communication ranges and may satisfy each of these logical channels up to their respective bucket sizes. If all logical channels in the minimum communication ranges have their bucket size satisfied and there is still space remaining in the grant, the WTRU may select logical channels outside of the minimum communication ranges. Such selection may also be based on one or more other criteria discussed herein (e.g. priority, Bj>0, etc.).

A WTRU may select the logical channels for a LCP based on a combination of one or more QoS parameters including a minimum communication range. A WTRU may determine the logical channels to be multiplexed in a grant based on a combination of bucket size, priority, and/or minimum communication range, as illustrated below.

A WTRU may select one or more highest priority logical channels having Bj>0, and may satisfy the logical channels of that priority up to their respective Bj's as long as the minimum communication range(s) of those logical channels fall within a certain range. In examples, logical channels outside a minimum communication range and having Bj>0 may be satisfied after logical channels with the highest priority and within the minimum communication range are satisfied. In examples, logical channels (e.g., of any priority) within a minimum communication range may be satisfied after the Bj's of one or more (e.g. all) logical channels (e.g., of any priorities) have been satisfied.

A WTRU may select one or more highest priority logical channels having Bj>0, and may further select those logical channels that fall within a certain minimum communication range so that the total value of Bj>0 for such logical channels (e.g., which have the same priority) may be maximized.

A WTRU may select a set of logical channels having Bj>0 (e.g., with any priority), and may further select those logical channels that fall within a certain minimum communication range so that the total value of Bj>0 or a weighted value of Bj>0 for the list of selected logical channels may be maximized. The weight used to calculate the weighted value of Bj may be linked to (e.g., based on) the priority of each corresponding logical channel.

A WTRU may restrict or prioritize the multiplexing of SDUs associated with MCR range separately from the multiplexing of SDUs not associated with a minimum communication range. For example, the WTRU may multiplex the SDUs associated with a minimum communication range together and multiplex the SDUs not associated with a minimum communication range together (e.g., separately from the multiplexing of the SDUs associated with a minimum communication range). A WTRU may multiplex logical channels associated with a minimum communication range up to the satisfaction of another QoS parameter (e.g., such as bucket size) and then consider multiplexing logical channels not associated with a minimum communication range if there is additional space in a grant. A WTRU may multiplex logical channels not associated with a minimum communication range up to the satisfaction of another QoS parameter (e.g., such as bucket size) and then consider multiplexing logical channels associated with a minimum communication range if there is additional space in a grant.

LCP restriction associated with MCR range may be applied when (e.g., only when) a first transmission selected has a minimum communication range that is below or above a threshold. For example, if a WTRU selects data for a first LCH associated with a first minimum communication range and the first minimum communication range is below a threshold, the WTRU may restrict the selection of other LCHs such that they fall within a minimum communication range or minimum communication ranges associated with the first LCH. If the WTRU selects a transmission with a minimum communication range above a threshold, the WTRU may select a LCH (e.g., any LCH regardless of the associated minimum communication range) without minimum communication range restrictions.

LCP restriction associated with a minimum communication range may comprise a WTRU selecting one or more LCHs that have a minimum communication range value equal to or less than the minimum communication range value associated with a first LCH selected. For example, the WTRU may select a first LCH based on other criteria (e.g., criteria unrelated to minimum communication range). The WTRU may (e.g., following such selection) select (e.g., only select) LCHs that have a minimum communication range value equal or less than the minimum communication range value associated with the first selected LCH.

A WTRU may decide whether to multiplex LCH with and without a range restriction.

A WTRU may be configured with LCHs with a minimum communication range and/or LCHs without a minimum communication range. For certain LCHs (e.g., those associated with groupcast), QoS flows with minimum communication range requirements may be grouped together, while for other LCHs (e.g., which may also be associated with groupcast), QoS flows without minimum communication range requirements may be grouped together. The WTRU may have one or more of the following behaviors when performing LCP in the presence of LCHs with or without a configured minimum communication range or set of minimum communication ranges.

The WTRU may be configured to not multiplex an LCH with a configured minimum communication range with an LCH without a configured minimum communication range. In examples (e.g., where an allowable range is determined by a first selected LCH, as described herein), if the WTRU selects a LCH that does not have a configured minimum communication range or set of minimum communication ranges, the WTRU may select (e.g., only select) other LCHs (e.g., for multiplexing) that also do not have a configured minimum communication range or set of minimum communication ranges. If the WTRU selects a LCH that has a configured minimum communication range or set of minimum communication ranges, the WTRU may select (e.g., only select) other LCHs (e.g., for multiplexing) that also have a configured minimum communication range or set of minimum communication ranges.

The WTRU may be configured to multiplex an LCH having a configured minimum communication range with an LCH that does not have a configured minimum communication range, for example, based on the specific minimum communication range or set of minimum communication ranges associated with LCH having a configured minimum communication range or set of minimum communication ranges. For example, if the WTRU selects a LCH that has a configured minimum communication range or set of minimum communication ranges, the WTRU may select one or more other LCHs (e.g., for multiplexing) that do not have a configured minimum communication range or set of minimum communication ranges as long as the minimum communication range or set of minimum communication ranges of the first selected LCH is large enough (e.g., based on the absolute minimum communication range value of one or more minimum communication ranges in the configured set), small enough (e.g., based on the absolute minimum communication range value of one or more minimum communication ranges in the configured set), wide enough (e.g., based on the size of the range), or narrow enough (e.g., based on the size of the range). If the WTRU selects a LCH that does not have a configured minimum communication range or set of minimum communication ranges, the WTRU may select one or more other LCHs (e.g., for multiplexing) with a configured minimum communication range or set of minimum communication ranges as long as the LCHs satisfy similar conditions as described above.

A WTRU may be configured to multiplex a LCH having a configured minimum communication range with a LCH that does not have a configured MINIMUM COMMUNICATION RANGE based on the distance between the minimum communication range(s) configured for one or more (e.g., each) of the QoS flows that are currently multiplexed with the LCH that does not have a configured minimum communication range. If the WTRU selects an LCH without a configured minimum communication range, the WTRU may decide whether the distance between the lowest minimum communication range QoS flow and largest minimum communication range QoS flow is larger than a threshold. If the distance is larger than the threshold, the WTRU may decide not to multiplex an LCH with a configured minimum communication range into the same PDU. Otherwise, the WTRU may decide to multiplex an LCH with a configured minimum communication range into the same PDU. The WTRU may determine the allowable minimum communication range(s) as illustrated by the examples provided herein.

A WTRU may determine whether to multiplex a LCH having a configured minimum communication range with a LCH that does not have a configured minimum communication range based on the actual QoS flows (e.g., and/or their associated minimum communication range) that have been mapped to a LCH. For example, the WTRU may select a LCH (e.g., a first LCH) without a configured minimum communication range or set of minimum communication ranges. The WTRU may determine the QoS flows that have been mapped to the LCH and their corresponding MCR range(s). The WTRU may determine whether a LCH (e.g., a second LCH) with a configured MCR range can be multiplexed into the PDU by considering one or multiple MCR ranges associated with the flows multiplexed into the first LCH, and applying the rules described herein to determine whether the second LCH is within the range of the first LCH (e.g., based on whether the minimum communication range of the second LCH includes the minimum communication range configured for one or more QoS flows mapped to the first LCH).

A WTRU may select an LCH configured with a minimum communication range or set of minimum communication ranges. The WTRU may then determine whether to multiplex a LCH without a configured minimum communication range based on the actual minimum communication range value associated with the flows multiplexed into the LCH without a minimum communication range requirement.

Figure 3:
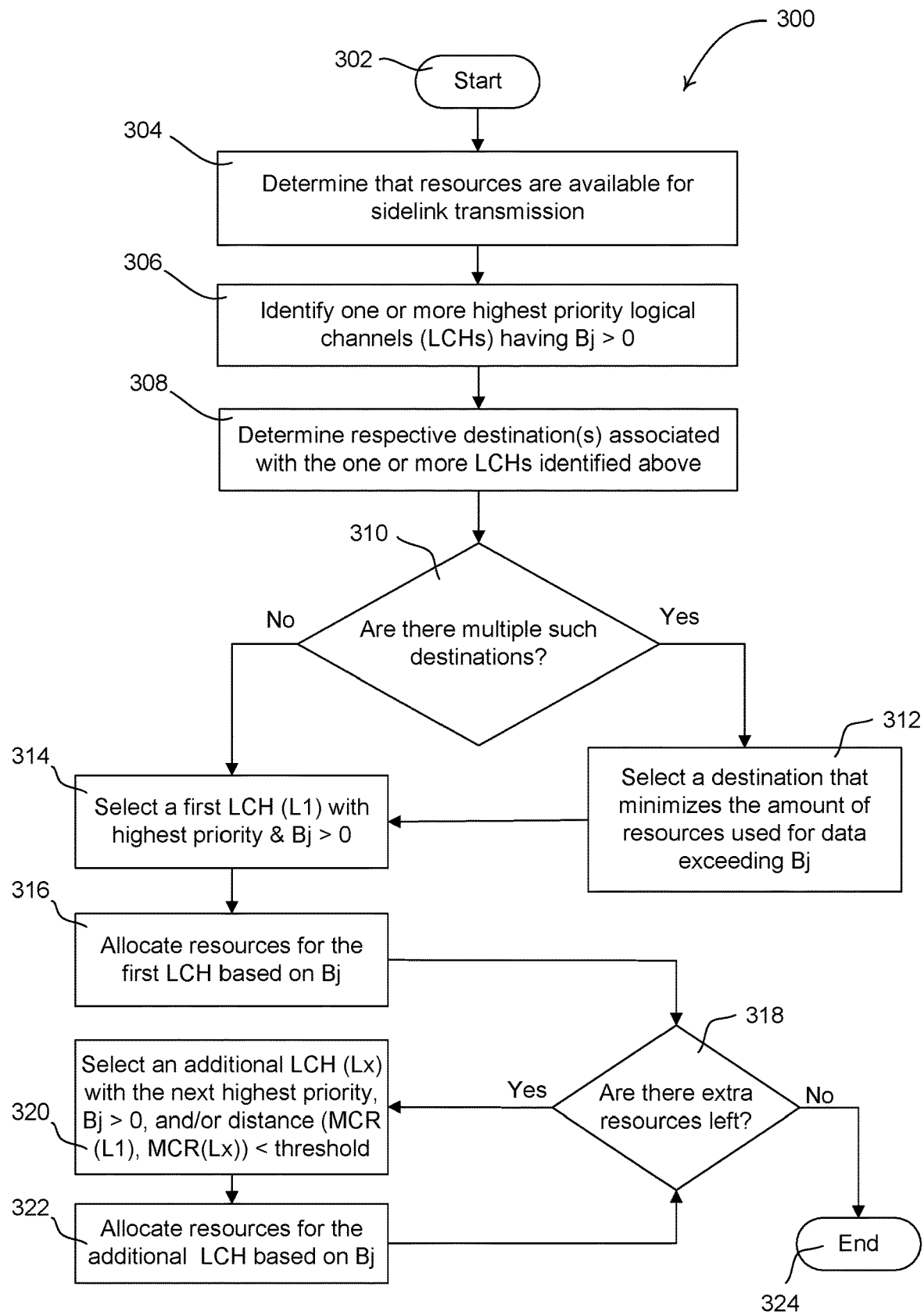
FIG. 3 is a diagram illustrating an example of destination selection.

FIG. 3 illustrates a destination selection procedure 300 that may be executed a WTRU. The procedure 300 may be performed by the WTRU (e.g., periodically) at 302. At 304, the WTRU may determine that a set of sidelink resources are available for the WTRU to perform a sidelink transmission. As described herein, the set of sidelink resources may be configured or scheduled by a network (e.g., in Mode 1) or the set of sidelink resources may be selected autonomously by the WTRU (e.g., from one or more preconfigured resource pools). The set of resources may include time and/or frequency resources, and/or may be configured specifically for sidelink transmission. In response to determining that the set of resources have become available, the WTRU may, at 306, identify one or more logical channels (LCHs) that have a bucket size parameter meeting a certain criterion. For example, the WTRU may identify the one or more logical channels that have Bj>0. Upon identifying the one or more logical channels having Bj>0, the WTRU may further select, from the identified logical channels, the logical channel(s) that have the highest transmission priority.

At 308, the WTRU may determine the respective destinations associated with the selected logical channels (e.g., the selected highest logical channel(s) having Bj>0). If the WTRU determines, at 310, that there are multiple destinations associated with logical channels that satisfy the criteria described above, the WTRU may, at 312, select the destination to which transmission may minimize the amount of resources used for data that exceed the Bj of the logical channels associated with the destination (e.g., transmission to the selected destination may result in the least amount of resources being used for data exceeding the Bj or may result in the maximum amount of resources being used to satisfy the Bj). If the WTRU determines, at 310, that there is only destination with logical channels that satisfy the criteria described above, the WTRU may, at 314, select a first LCH (L1) associated with the destination that has the highest priority and Bj>0 and allocate at least a portion of the available resources to the transmission of L1 (e.g., to satisfy the Bj of L1) at 316.

At 318, the WTRU may check whether there are extra resources left for transmission. If there are resources left, the WTRU may select an additional LCH (Lx) for transmission (e.g., to be multiplexed with the transmission of L1) at 320 based on one or more of a priority, a bucket size related parameter (e.g., Bj) or a minimum communication range (MCR) associated with the additional LCH (Lx). For example, the WTRU may select an additional LCH that has the next highest priority (e.g., among the remaining logical channels associated with the destination), has Bj>0, and/or has a minimum communication range that is within a distance of the minimum communication range of the first logical channel L1 (e.g., distance (MCR (L1), MCR(Lx)) <threshold, where the threshold may be configured/signaled by a network or determined by the WTRU). Upon selecting such an additional LCH (Lx), the WTRU may allocate at least a portion of the available resources to the transmission of Lx (e.g., to satisfy the Bj of Lx). The transmission of L1 and Lx may be multiplexed together (e.g., in the same PDU). The WTRU may repeat the operations at 318-322 until there are no more resources left, up which the WTRU may end the destination selection procedure 300 at 324.

A WTRU may determine the minimum communication range to be transmitted in SCI or sent to L1. In examples (e.g., following LCP), a WTRU may determine a minimum communication range value to be transmitted in SCI. Such a minimum communication range may be transmitted explicitly or may be combined with other QoS parameters into a L1 QoS parameter (e.g., such as L1 priority). The value of the L1 QoS parameter may be associated with a specific minimum communication range and/or other QoS parameters such as one or more reliability, latency, or priority related parameters.

A WTRU may determine the minimum communication range to be sent to L1 based on one or more of the following. The WTRU may use one or more of the minimum communication range or set of minimum communication ranges associated with a LCH configured with the largest minimum communication range or largest list of minimum communication range values. The WTRU may use the largest upper bound minimum communication range value associated with a set of LCHs multiplexed into a PDU. The WTRU may use the largest lower bound minimum communication range value associated with a set of LCHs multiplexed into a PDU. The WTRU may use the largest midpoint minimum communication range value associated with a set of LCHs multiplexed into a PDU. The WTRU may use the largest minimum communication range (e.g., a single minimum communication range value) configured for any of the LCHs multiplexed into a PDU. The WTRU may use the largest minimum communication range among the list of minimum communication ranges configured for one or more (each) of the LCHs multiplexed into a PDU. The WTRU may use the largest minimum communication range associated with one or more (e.g., any) QoS flows mapped to a (e.g., any) LCH multiplexed into the PDU.

A WTRU may be configured to select from a plurality of candidate values (or combination thereof) a suitable value for a transmission parameter. Minimum communication range, data rate and/or fairness requirements may be satisfied based on the respective values a WTRU selects for one or more transmission parameters.

A transmission parameter value may be selected based on the data available for transmission, based on a property of the data, a requirement associated with the data, and/or a variable associated with the data. For example, a transmission parameter value may be selected based on the minimum communication range of a logical channel (or a MAC SDU) for which there is data available for transmission. A transmission parameter value may be selected based on one or more parameters or variables used in LCP, such as a bucket variable for a logical channel j representing a buck size associated with the logical channel (Bj), a prioritized bit rate (PBR), and/or a logical channel priority. A transmission parameter value may be selected based on the identity of a WTRU or a group of WTRUs intended to receive the data available for transmission.

The data or LCH used for parameter selection may be determined as follows. A WTRU may determine the data or logical channel as a function of which parameter selection is performed. A WTRU may consider a set of logical channels that meet one or more the following conditions. A WTRU may consider a logical channel that has data available for transmission. A WTRU may consider a logical channel that for which a variable Bj (e.g., representing a buck size associated with the logical channel) used in LCP is above a specific threshold (e.g., zero).

One or more of the conditions described above (e.g., the second condition described above) may service to ensure the fairness of transmission, e.g., since the conditions may prevent the use of resources beyond what is required to meet a quality requirement (e.g., a data rate requirement) of the logical channel. A WTRU may restrict the selection of logical channels to a logical channel that has the highest priority among all logical channels meeting a given condition.

A WTRU may determine a target minimum communication range that may be used in the determination of transmission parameters and/or in generating a report for the network. The target minimum communication range may be, for example, the highest minimum communication range level (or value) among multiple minimum communication range values associated with a logical channel(s) (e.g., as determined above) or with a MAC SDU available for transmission.

In examples (e.g., when network-controlled operation is supported, as in network scheduled mode, e.g., Mode 1), a WTRU may signal a target minimum communication range to the network, for example, via physical layer and/or MAC layer signaling. A WTRU may include a target minimum communication range in an enhanced buffer status report. A WTRU may trigger transmission of a MAC control element (or an enhanced BSR) when there is a change in the target minimum communication range. In examples (e.g., when no PUSCH resources are available), a WTRU may transmit a target minimum communication range in a physical layer signal such as a scheduling request. A WTRU may report a target maximum communication range.

A WTRU may decrease a target minimum communication range to a level lower than the minimum communication range level associated with the data available for transmission, for example, if there is no intended receiver beyond a certain communication range lower than that minimum communication range level. A WTRU may obtain the location of an (e.g., each) intended receiver (e.g., through higher layer signaling) and may determine a maximum distance among the intended receivers. A WTRU may obtain a path loss estimate for an (e.g., each) intended receiver and may determine a maximum path loss among the intended receivers. Such estimation may be performed and reported by the intended receivers, or be performed directly by the WTRU (e.g., based on the signaling of known transmission power).

Transmission parameters (e.g., MCS) may be selected to maximize a metric (e.g., spectral efficiency). A WTRU may select a combination of transmission parameters within a candidate set that meet at least one of the following conditions. A WTRU may select a combination of transmission parameters such that the transmission is suitable for a target minimum communication range. A WTRU may select a combination of transmission parameters such that a metric (as described herein) is maximized or minimized.

The attempted maximization (or minimization) of a metric may be used to attempt to maximize spectral efficiency and/or minimize transmission power. The attempted maximization (or minimization) may be realized in various ways, e.g., depending on how a WTRU selects transmission parameters.

A WTRU may be configured to select a modulation and coding scheme (MCS) from a configured set or range of MCS values. A WTRU may select the highest MCS value for which a transmission is suitable. A WTRU may select the minimum or maximum table index entry from a parameter table (e.g., from a MCS table) if the table is ordered by MCS values. A WTRU may select an MCS such that the required transmission power suitable for a target minimum communication range is maximized while still below the actual transmission power of the WTRU (e.g., which may be set independently).

A WTRU may be configured to select a combination of MCS and transmission power levels from a configured (e.g., pre-defined) set of candidate combinations. Such combinations may be ordered, for example, based on the highest MCS levels in a descending order such that a transmission may be suitable. A WTRU may select the highest value such that a transmission is suitable for a target MCS and/or that the transmission power level is lower than a maximum power level configured for the WTRU (e.g., a maximum power level configured by an independent power control mechanism).

A WTRU may determine candidate resources based on a target transport block size. A WTRU may be configured to select resources (e.g., in frequency and/or time domain) for a grant from a plurality of candidate resources. The set of candidate resources may be such that different candidate resources may occupy different number of resource blocks, time slots, and/or symbols. The set of candidate resources may be restricted by factors such as channel occupancy, as described herein.

A WTRU may determine a transport block size for each candidate resource based on frequency allocation, time allocation, and/or other parameters such as MCS. The MCS may in return be determined, for example, based on a target minimum communication range as described herein.

A WTRU may select a candidate resource such that the amount of used resources may be minimized and/or QoS requirements (e.g., data rate) may be satisfied. A WTRU may determine a target transport block size as the smallest transport block size such that at least one of the following conditions may be satisfied for at least one logical channel (e.g., after LCP is performed for MAC PDUs or transport blocks): no data may be available for transmission for the at least one logical channel or a variable Bj (e.g., which may represent a buck size associated with logical channel j) associated with the at least one logical channel and used in LCP is below a threshold (e.g., zero). Other conditions may also be selected and the selection of the conditions may depend on the concerned logical channel(s).

Once a target transport block size is determined, a WTRU may restrict the set of candidate resources to those for which the corresponding transport block size is the smallest while still above the target transport block size. This approach may ensure that the WTRU does not use resources beyond what is required to satisfy a given QoS requirement.

A WTRU may make a best effort when transmitting beyond a certain minimum communication range (e.g., a minimum communication range configured for a specific flow, bearer, and/or transmission). For example, the WTRU may use best-effort transmission parameters (e.g., best or optimal transmission parameters available to the WTRU) if a receiving device (e.g., a receiving WTRU) is located outside the minimum communication range.

To illustrate, a WTRU engaging in V2X transmission may modify one or more aspects of the WTRU's sidelink transmission parameters based on whether a receiving device (e.g., an RX WTRU) is within or outside of a certain minimum communication range (e.g., a minimum communication range configured for a specific flow, bearer, and/or transmission). The WTRU (e.g., a transmitting or TX WTRU) may operate with optimal transmission parameters targeted to meet the QoS requirements of a transmission when such transmission is associated with a minimum communication range and a WTRU receiving the transmission is located within the minimum communication range. On the other hand, if the transmission is associated with a minimum communication range and a WTRU receiving the transmission is located outside of the minimum communication range, the transmitting WTRU may switch to parameters that are not intended to meet the aforementioned QoS requirements. Such QoS requirements may be related to at least latency, priority, data rate, and/or reliability.

A receiving WTRU (e.g., an RX WTRU) may provide an indication of its location and/or whether the WTRU is located inside or outside of a minimum communication range, for example, via SCI or a sidelink control message.

A receiving WTRU may transmit its location, or indicate a change in its location via a control message. A transmitting WTRU may determine whether a receiving WTRU is within the minimum communication range for a specific transmission based on the reception of such control message. Such control message may comprise dedicated SCI, SL MAC CE, feedback information, or SL RRC message. The control message may comprise geolocation information, zone or subzone index, indication of a change in location, or similar information for the receiving WTRU. For example, the control message may comprise location information of the receiving WTRU such as geolocation coordinates, zone ID, subzone ID, and/or the like. The control message may comprise an indication of whether the receiving WTRU is within or outside a certain minimum communication range (e.g., a minimum communication range associated with a specific SLRB). The control message may comprise one or more SLRB IDs for which the receiving WTRU is inside or outside a certain minimum communication range. The control message may comprise link feedback related information such as HARQ feedback, CQI reports, etc. The control message may comprise a WTRU ID, a unicast link ID, and/or the like.

A WTRU may determine whether to transmit its location information based on a configuration (e.g., based on SL bearer configuration). For example, a receiving WTRU may receive a SL bearer configuration for a unicast link from a transmitting WTRU. The configuration may explicitly configure periodic location transmission at the receiving WTRU. The receiving WTRU may determine whether and/or when to transmit location information based on a bearer configuration associated with the transmitting WTRU, based on the location of the receiving WTRU, and/or based on a transmission characteristic of the transmitting WTRU.

A receiving WTRU may respond to a feedback request (e.g., sent by a transmitting WTRU) when the receiving WTRU is within a certain minimum communication range. The receiving WTRU may transmit feedback information when (e.g., only when) the WTRU is within a certain minimum communication range. A feedback request by a transmitting WTRU may be implicitly sent based on the transmission of a reference signal (e.g., when the transmitting WTRU includes CSI-RS in its transmission). For example, a transmitting WTRU may transmit an RRC request message (e.g., such as a maintenance message) and a receiving WTRU may respond (e.g., only respond) to the maintenance message when the receiving WTRU is within a certain minimum communication range. The receiving WTRU may determine that it is within the configured minimum communication range based on a bearer configuration, the location of the transmitting WTRU (e.g., which may be indicated in the transmitting WTRU's transmission such as a CQI request), and/or the receiving WTRU's own location information. For example, a receiving WTRU may compute the distance between itself and a transmitting WTRU based on the location information of the transmitting WTRU (e.g., as indicated in a CQI request) and the receiving WTRU's own location. If this distance is smaller than the minimum communication range associated with a SLRB configured by the transmitting WTRU, the receiving WTRU may respond to a feedback request by the transmitting WTRU. Otherwise, the receiving WTRU may ignore the feedback request.

A transmitting WTRU may signal an applicable minimum communication range, for example, in a feedback request. Such a feedback request may be specific to a particular minimum communication range. A receiving WTRU may send feedback when (e.g., only when) the receiving WTRU determines that it is within the minimum communication range associated with the feedback request. The transmitting WTRU may transmit the minimum communication range associated with a feedback request explicitly in a feedback request message. A CQI request, a data transmission including CSI-RS, or another feedback request sent by the transmitting WTRU may include an explicit indication of the minimum communication range for which feedback is expected. Sidelink control information associated with a CQI request or a data transmission may also include such an explicit indication.

A receiving WTRU may determine an applicable minimum communication range, for example, based on data multiplexed with a transmission by the transmitting WTRU. The receiving WTRU may determine the LCH(s) or SLRB (s) comprised in such a transmission. The receiving WTRU may treat the minimum communication range of a feedback request provided with such a transmission as the worst case (e.g., largest) minimum communication range configured with one or more (e.g., each) of the transmitted SLRBs.

A WTRU (e.g., a transmitting WTRU) may transmit (e.g., signal) an offset (e.g., a distance) from the minimum communication range associated with a data transmission and a receiving WTRU may apply the offset in determining the minimum communication range associated with a feedback request. A WTRU (e.g., a transmitting WTRU) may transmit an indication to signal whether the minimum communication range associated with a feedback request should be associated with a data minimum communication range or another minimum communication range. Such other minimum communication range may be determined based on a SLRB configuration of the transmitting WTRU (e.g., a SLRB with the largest minimum communication range). A WTRU (e.g., a transmitting WTRU) may transmit a SLRB or LCH index in a feedback request and a receiving WTRU may determine an applicable minimum communication range for the feedback request based on the minimum communication range configured with that SLRB or LCH.

A receiving WTRU may transmit an indication of its location when the WTRU moves into or out of a minimum communication range. The receiving WTRU may transmit an event-triggered control message when it transitions from being inside (or outside) the minimum communication range of at least one or more SLRB to being outside (or inside) the minimum communication range of the one or more SLRB. The receiving WTRU may determine its distance from a transmitting WTRU based on location information included in a data or control transmission of the transmitting WTRU and the receiving WTRU's own location. The receiving WTRU may determine the minimum communication range information associated with a SLRB based on SLRB configuration information (e.g., which may be sent via SL RRC signaling).

A receiving WTRU may (e.g., periodically) transmits location information based on a SLRB configuration. For example, the receiving WTRU may determine to periodically transmit location information when the SL bearer configuration of a transmitting WTRU includes at least one SLRB configured with a range requirement. The receiving WTRU may receive the SL bearer configuration of the transmitting WTRU via SL RRC messaging associated with unicast and/or groupcast link establishment or modification. The receiving WTRU may transmit such periodic location information when the WTRU determines that it is within the minimum communication range of at least one SLRB, as described herein.

A receiving WTRU may transmit HARQ feedback along with a transmission range indication.

In examples (e.g., for a unicast SL groupcast transmission), a WTRU may not transmit a HARQ feedback for a PSSCH transmission when the TX-RX distance associated with the PSSCH transmission is larger than that specified by a communication range requirement such as a minimum communication range requirement (e.g., the PSSCH transmission is outside of the minimum communication range). In these cases, the transmitting WTRU may observe HARQ discontinuous transmissions (DTX) in the associated physical sidelink feedback channel (PSFCH) (e.g., the transmitting WTRU may receive no HARQ ACK/NACK).

A transmitting WTRU may perform a HARQ re-transmission upon receiving a HARQ DTX (e.g., because the HARQ DTX may indicate that a receiving WTRU may have failed to decode the PSCCH). In these cases, a transport block (TB) may be correctly received and a HARQ re-transmission may not actually be necessary. A HARQ DTX outside a minimum communication range may be distinguished from other HARQ DTX transmissions to avoid or reduce unnecessary HARQ re-transmissions.

In examples (e.g., for a group transmission with HARQ enabled), a WTRU may transmit a HARQ feedback including HARQ ACK/NACK information and/or an out-of-minimum communication range indicator. For instance, the WTRU may transmit one or more additional bits in the HARQ feedback payload to indicate whether the HARQ feedback information pertains to a TB received within a minimum communication range (MCR). A transmitting WTRU may receive the HARQ feedback with the minimum communication range indicator and may perform a HARQ re-transmission, e.g., in accordance with the example rules illustrated in the table below. When no HARQ re-transmission is performed, a transmitting WTRU may flush its HARQ buffer. The transmitting WTRU may apply "best effort" transmissions subsequently, e.g., based on configured (e.g., preconfigured) transmission parameters for WTRUs that are outside of the minimum communication range.

| HARQ feedback payload | WTRU HARQ re-transmission |
|---|---|
| HARQ ACK + in-MCR | No |
| HARQ NACK + in-MCR | Yes |
| HARQ ACK + out-of-MCR | No |
| HARQ NACK + out-of-MCR | No |

The HARQ feedback payload comprising a transmission range indicator as described herein may use reserved cyclic shifts. For example, four cyclic shift values of a sequence may be configured, reserved, and/or used. One or more of the cyclic values may be selected or determined based on the HARQ feedback payload.

Example sets (e.g., three sets) of cyclic shift values may include, for example, Set-1: {0, 3, 6, 9}, Set-2: {1, 4, 7, 10}, and Set-3: {2, 5, 8, 11}.

A set of cyclic shift values may be determined based on one or more of following. The cyclic shift values may be determined based on the subchannel index (e.g., the first subchannel index) of an associated PSSCH/PSCCH transmission. A set of cyclic shift values may be determined based on the number of subchannels. A set of cyclic shift values may be determined based on the number of PSFCH resources within a slot.

Example cyclic shift value assignments for each HARQ feedback payload within a set may be as illustrated in the table below.

| HARQ feedback payload | Cyclic shift value of PSFCH |
|---|---|
| HARQ ACK + in-MCR | $1^{st}$ cyclic shift value |
| HARQ NACK + in-MCR | $3^{rd}$ cyclic shift value |
| HARQ ACK + out-of-MCR | $2^{nd}$ cyclic shift value |
| HARQ NACK + out-of-MCR | $4^{th}$ cyclic shift value |

In examples (e.g., when multiple HARQ-ACK bits are multiplexed), the in-MCR and/or out-of-MCR status of a transmission may be indicated in a HARQ-ACK transmission. In examples, if the number of HARQ-ACK bits exceeds a threshold, a receiving WTRU may not include an in-MCR or out-of-MCR indicator in the HAR-ACK transmission.

Separate PSFCH resource pools may be used for in-MCR and out-of-MCR transmissions. For example, a first PSFCH resource pool may be used when a receiving WTRU is in-MCR and a second PSFCH resource pool may be used when the receiving WTRU is out-of-MCR. The one or more PSFCH resource pools may be multiplexed in the frequency domain, for example, so that a receiving WTRU may report HARQ feedback in the same slot irrespective of the in-MCR or out-of-MCR status of the WTRU. One or more of following may apply.

A transmitting WTRU may not retransmit a sidelink transmission if the WTRU receives HARQ feedback in an out-of-MCR PSFCH resource pool.

An in-MCR PSFCH resource pool may be configured without an associated out-of-MCR PSFCH resource pool. When an out-of-MCR PSFCH resource pool is not configured, a receiving WTRU may not send HARQ-ACK when the WTRU is out-of-MCR.

If both in-MCR PSFCH and out-of-MCR PSFCH resource pools are configured, a receiving WTRU may send HARQ feedback irrespective of the in-MCR or out-of-MCR status of the WTRU.

A transmitting WTRU may determine whether one or more receiving WTRUs are within a minimum communication range. The transmitting WTRU may make the determination based on a location indication provided by the one or more receiving WTRUs, as discussed herein. For example, the transmitting WTRU may transmit a request message (e.g., such as an RRC maintenance message, a CQI request, etc.) destined to one or more receiving WTRU. Based on the presence of a response message and/or location information included in the response message, the transmitting WTRU may determine whether one or more receiving WTRUs are within the minimum communication range associated with a bearer.

A transmitting WTRU may use the transmissions of a receiving WTRU (e.g., which may include location information of the receiving WTRU) to determine whether the receiving WTRU is within a minimum communication range. For example, a transmitting WTRU may receive one or more transmissions by a receiving WTRU that include the location information of the receiving WTRU. The transmitting WTRU may determine the distance between itself and the receiving WTRU based on this location information and the transmitting WTRU's own location. If the distance is smaller than the minimum communication range associated with a packet, flow or SLRB, the transmitting WTRU may determine that the receiving WTRU is within the minimum communication range associated with that packet, flow, or SLRB. A transmitting WTRU may determine whether a receiving WTRU is within a minimum communication range based on reception of HARQ feedback from that receiving WTRU. The receiving WTRU may be configured with HARQ feedback resource(s) on which to transmit ACK/NACK. If the transmitting WTRU observes one or more (e.g., consecutive) DTX on such resource(s), the transmitting WTRU may assume that the receiving WTRU is outside the minimum communication range associated with the transmitting WTRU's transmissions.

A transmitting WTRU may determine a receiving WTRU associated with a unicast or groupcast session based on one or more of the following.

A transmitting WTRU may determine a receiving WTRU associated with a unicast or groupcast session based on link establishment signaling. For example, the transmitting WTRU may obtain the WTRU ID of a peer receiving WTRU during unicast link establishment signaling and/or exchange. The transmitting WTRU may initiate unicast link establishment signaling with one or more (e.g., each)

WTRUs in a group and may determine the list of WTRUs in a groupcast session based on response(s) associated with the unicast link establishment. The unicast link establishment may be initiated by an upper layer (e.g., a NAS layer)

A transmitting WTRU may determine a receiving WTRU associated with a unicast or groupcast session based on one or more upper layers. For example, the transmitting WTRU may obtain a list of WTRU IDs (e.g., source WTRU IDs) associated with a groupcast session or a groupcast destination ID based on information provided by an upper layer (e.g., a NAS layer, a V2X layer, and/or an application layer).

A WTRU may associate a minimum communication range with a LCH or a SLRB. A WTRU may determine the minimum communication range associated with a SLRB based on a network configuration (e.g., explicit signaling of the minimum communication range in a SLRB configuration). A WTRU may determine the minimum communication range associated with a SLRB based on the minimum communication range configured for a (e.g., each) flow that is mapped to the SLRB. For example, a WTRU may be configured with a mapping (e.g., a mapping rule) between flows and SLRBs, and the WTRU may determine the minimum communication range of a SLRB as the worst case (e.g., largest) minimum communication range associated with all flows mapped to that bearer.

A WTRU may assign a default value (e.g., 0m) to a minimum communication range associated with a flow if the flow is not associated with a minimum communication range configured by an upper layer.

A transmitting WTRU may modify a transmission-related parameter for a bearer or for transmissions associated with a minimum communication range. For example, a transmitting WTRU may modify a transmission-related parameter (e.g., a parameter associated with a bearer) when the WTRU determines that one or more receiving WTRUs are outside of a minimum communication range (e.g., a minimum communication range associated with the bearer). A transmitting WTRU may make such a determination based on signaling and/or transmissions from a receiving WTRU as described herein. For example, a transmitting WTRU may use one or more configured parameters to be used in a best effort scenario, as described herein. Such best effort parameters may be fixed or predetermined and/or may correspond to default values. A transmitting WTRU may use such configured or predetermined parameters in lieu of configured parameters associated with a SLRB. For example, a transmitting WTRU may replace a SLRB configuration with one or more of the following configured or predetermined values when one or more (e.g., all) transmitting WTRUs are outside of the minimum communication range for a SLRB.

A transmitting WTRU may use default or preconfigured variables or parameters in a LCP procedure. For example, the transmitting WTRU may use a different or a default value of PBR, BSR, or Bj during the LCP procedure. The transmitting WTRU may set the Bj to 0 (or a similar default value) for a SLRB or LCH. The transmitting WTRU may set the allowable BW, allowable number of resources, allowable number of carriers, etc. associated with resource selection to default, configured or predetermined values. The transmitting WTRU may use a default or different value of priority (e.g., as used in LCP) for a LCH. The transmitting WTRU may modify one or more LCP restrictions to allow or disallow a LCH to be multiplexed with other LCHs. In examples, the transmitting WTRU may be allowed to multiplex LCHs together if (e.g., only if) the intended WTRUs are within the minimum communication range of at least one of the LCHs. In examples, the transmitting WTRU may be allowed to multiplex LCHs together if (e.g., only if) the intended WTRUs are outside of the minimum communication range of at least one of the LCHs.

A transmitting WTRU may use default or preconfigured variables or parameters for resource selection. For example, the transmitting WTRU may set the resource selection window to a different value (e.g., for resource selection associated with LCHs where the intended WTRUs are outside of the minimum communication range of at least one of the LCHs). The transmitting WTRU may set a parameter associated with a number of resources to certain default or predetermined value for one or more sidelink processes. The number of resources may include those that the WTRU can reserve in advance or maintain following a reselection. The one or more sidelink processes may be intended for LCHs where the intended WTRUs are outside of the minimum communication range of at least one of the LCHs. The transmitting WTRU may be allowed to perform periodic transmissions if (e.g., only if) those transmissions include data for which the intended WTRUs are inside a certain minimum communication range. The transmitting WTRU may be configured with a different resource availability threshold.

A transmitting WTRU may use default or preconfigured values for one or more PHY parameters. For example, the transmitting WTRU may set transmission parameters such as MCS, TX power, number of retransmissions, and/or the like to default, predefined, or configured values for transmissions associated with a LCH for which the intended WTRUs are outside a certain minimum communication range. The transmitting WTRU may be allowed to perform duplication of transmissions based on whether such transmissions are associated with a LCH for which the intended WTRUs are inside a certain minimum communication range.

A transmitting WTRU may use default or preconfigured values for unicast or groupcast feedback configurations. For example, the transmitting WTRU may disable HARQ feedback associated with a transmission for which the intended receivers (e.g., WTRUs) are outside of a certain minimum communication range. The transmitting WTRU may disable transmission of CSI-RS when one or more receiving WTRUs are outside of a minimum communication range associated with one or more (e.g., any or all) LCHs or SLRBs.

A transmitting WTRU may modify a flow-to-bearer mapping for a flow associated with a minimum communication range. For example, the transmitting WTRU may change a flow-to-bearer mapping associated with a flow based on whether an intended receiving WTRU of the flow is within or outside of a certain minimum communication range. The transmitting WTRU may map a flow for which at least one of the intended WTRUs are within the minimum communication range to a SLRB with QoS requirements configured to meet one or more QoS requirements of the flow. The transmitting WTRU may map a flow for which at least one of the intended WTRUs are outside of the minimum communication range to a default or best effort SLRB. The default or best effort SLRB may be associated with similar parameters as the default, predefined, or configured parameters discussed herein that may be modified for a QoS specific SLRB.

A transmitting WTRU may consider one or more of the following factors (e.g., in addition to determining whether a receiving WTRU is outside of a certain minimum communication range) when deciding whether to perform a transmission using best effort SLRB and/or parameters.

A transmitting WTRU may consider measured congestion of one or more SL resources when deciding whether to perform a transmission using best effort SLRB and/or parameters. For example, the transmitting WTRU may be configured with a threshold channel busy ratio and may decide to perform a transmission using best effort parameters if the measured channel busy ratio is above the threshold. The transmitting WTRU may be configured to use different SLRB configurations or parameters (e.g., different default configurations or parameters) based on a measured channel busy ratio.

A transmitting WTRU may consider the velocity of the transmitting WTRU and/or the relative motion between the transmitting WTRU and a receiving WTRU when deciding whether to perform a transmission using best effort SLRB and/or parameters. For example, the transmitting WTRU may be configured to perform a transmission using default SLRB configurations and/or parameters when (e.g., only when) the WTRU's velocity is below a threshold or the relative velocity of the WTRU compared to one or more other WTRUs (e.g., peer WTRUs) is below a threshold.

A transmitting WTRU may consider a network configuration when deciding whether to perform a transmission using best effort SLRB and/or parameters. For example, the transmitting WTRU may be configured (e.g., via SIB or RRC signaling) with an indication of whether to perform a transmission using default SLRB parameters. Such an indication may be implicit (e.g., be included or indicated in the configuration of such parameters by the network).

A WTRU may be configured to perform best effort transmission when the WTRU is beyond a minimum communication range.

A WTRU may be configured to favor (e.g., give higher priority to) transmissions with lower minimum communication range during congestion control (e.g., in order to mitigate congestion).

A WTRU may operate with different sets of congestion-controlled TX parameters based on the range requirements (e.g., minimum communication range) of the transmission (e.g., data transmission). For example, lower/smaller minimum communication range minimum communication range transmissions may be favored (e.g., be given a higher priority) over larger minimum communication range transmissions when congestion occurs (e.g., when a minimum communication range may not be met for larger minimum communication range transmissions due to congestion control). A WTRU may perform one or more of the following during congestion control.

The WTRU may set a default value for a TX related parameter (e.g., set TX power to 0). The WTRU may drop a transmission. The WTRU may stop performing resource selection for a transmission. The WTRU may disable HARQ for a transmission. The WTRU may disable carrier aggregation for a transmission. The WTRU may suspend a SLRB and/or a LCH associated with a transmission.

A WTRU may be configured with a set of congestion-controlled TX parameters (e.g., such as a maximum TX power, a limit on the number of retransmissions, a maximum number of selected subchannels, etc.). These parameters may be configured based on congestion, priority, and/or transmission range. For example, the WTRU may be configured with respective sets of congestion controlled parameters for different combinations of one or more of the following values, and the WTRU may apply a set of congestion-controlled TX parameters that corresponds to the combination of values associated with a measured CBR and a set of transmission parameters being used. The one or more values may include, for example, a range of measured CBRs, a priority value (e.g., PPPP or LCH priority), a latency value, a reliability value, and/or a minimum communication range value or set of minimum communication range values.

A WTRU may determine or may be configured with a threshold minimum communication range. The WTRU may perform congestion control for a transmission differently based on whether the transmission has an associated minimum communication range that is above or below the configured threshold minimum communication range. The WTRU may perform congestion control for a transmission differently based on whether a measured CBR meets certain criteria (e.g., whether the CBR is above a threshold, for example, for transmissions of a specific priority). For example, when a measured CBR meets certain criteria (e.g., a set of preconfigured criteria), the WTRU may apply the default value of one or more TX parameters (e.g., set maximum TX power to 0) for transmissions having a minimum communication range above a threshold. The WTRU may determine a single threshold or the WTRU may determine respective thresholds for multiple destination L2 IDs (e.g., for each destination L2 ID). The WTRU may determine the threshold(s) based on one or more of the following.

The WTRU may determine the threshold(s) based on a network configuration. For example, the WTRU may be configured with one or more threshold minimum communication ranges. Different threshold minimum communication ranges may be configured for different measured CBR levels, for different LCH or PPPP priority levels, for different PQI values, and/or for different latency requirements associated with the same data transmission.

The WTRU may determine the threshold(s) based on distance information (e.g., distance between the WTRU and other WTRU(s) or gNB(s)). For example, the WTRU may determine the threshold MCR based on explicit information about the distance between the WTRU and a peer WTRU. The WTRU may calculate the threshold based on a peer WTRU that is the shortest distance away from the current WTRU. For example, the threshold may be calculated as a percentage of the shortest distance, where the percentage may be configured (e.g., by a network).

The WTRU may determine the threshold(s) based on HARQ, CQI, and/or other feedback, for example, from a peer WTRU. For example, the WTRU may determine the threshold minimum communication range based on one or more feedback received from a peer WTRU or multiple WTRUs. Such feedback may include, for example, a measured power (e.g., RSRP) of the HARQ feedback from one or more peer WTRUs, CQI reports from one or more peer WTRUs, ACK/NACK statuses from one or more peer WTRUs.

In examples, the WTRU may derive the threshold minimum communication range using (e.g., in accordance with) a preconfigured formula or function of the RSRP associated with a PSFCH transmission. The PSFCH transmission may be received from a group of one or more WTRUs that are associated with a same L2 destination ID (e.g., via a group or unicast link) for which congestion control is being considered. The RSRP may be a minimum RSRP, a maximum RSRP, or an average RSRP, e.g., in the case of groupcast. The RSRP may correspond to the last PSFCH transmission from a group of one or more WTRUs associated with a group or unicast link. The WTRU may compute an average RSRP of such PSFCH transmissions over a period of time (e.g., over a time window). The WTRU may use the average RSRP to compute the threshold minimum communication range.

A WTRU may treat transmissions without a configured minimum communication range requirement (e.g., for unicast or groupcast transmissions) as having a maximum minimum communication range or an infinite minimum communication range. Such transmissions may be subject to legacy congestion control (e.g., without consideration of minimum communication ranges). For example, these transmissions may not be dropped or de-prioritized when a range cannot be met.

A SLRB may be specifically configured to meet certain QoS requirements.

SLRB configurations mapped to a QoS profile may be limited (e.g., for a WTRU in IDLE mode) due to SIB overheads and/or non-standardized PQIs that require the broadcasting of QoS information (e.g., all QoS information).

A WTRU may be configured to select an SLRB configuration (e.g., among multiple configurations) that best represents the QoS profile of a flow.

A WTRU may determine the SLRB configuration for a specific QoS profile and/or flow that is not configured by the network (e.g., via SIB, preconfiguration, or dedicated signaling) by selecting a configured SLRB configuration that best represents the QoS profile or flow. The WTRU may make such a determination based on the similarity of QoS parameter values in the QoS profile (e.g., the QoS profile associated with a configured flow).

A WTRU may be configured with one or more QoS profiles (e.g., equivalent QoS profiles) for a QoS flow (e.g., in addition to an actual QoS profile). Such configuration may be provided from an upper layer, for example. A WTRU configured with a flow associated with a non-standardized PQI may be configured with one or more standardized PQIs (e.g., equivalent standardized PQIs), and may select the configuration associated with such standardized PQI when establishing a SLRB for the non-standardized PQI flow.

A WTRU may determine which of the configured SLRB configurations to use for a QoS flow or profile that does not have a network configuration, for example, by selecting the SLRB configuration associated with a QoS profile that has one or more similar QoS parameters which are the same or similar. For example, the WTRU may select the SLRB configuration associated with a QoS profile that has the same latency requirement (e.g., in the PQI), the WTRU may select the SLRB configuration associated with a QoS profile that has the same reliability requirement (e.g., in the PQI), etc.

Although the examples described herein may consider LTE, LTE-A, New Radio (NR) or 5G specific protocols, it is understood that the examples described herein are not restricted to those scenarios and may be applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A wireless transmit receive unit (WTRU), comprising:
a processor configured to:
determine that a set of resources is available for the WTRU to perform a sidelink transmission;
determine a set of one or more logical channels, wherein each of the one or more logical channels in the set is determined based on the logical channel having data available for transmission and having a respective bucket size parameter with a value greater than zero, and wherein, on a condition that hybrid automatic repeat request (HARQ) feedback is not configured for the set of resources, each of the one or more logical channels in the set is determined further based on the logical channel having HARQ feedback disabled;
select a logical channel from the determined set of one or more logical channels, wherein the selected logical channel has a highest priority in the determined set of one or more logical channels;
determine a destination associated with the selected logical channel; and
transmit data associated with the selected logical channel to the determined destination using at least a portion of the set of resources available for the sidelink transmission.

2. The WTRU of claim 1, wherein the respective bucket size parameter associated with each logical channel in the determined set of one or more logical channels is determined based on at least a prioritized bit rate.

3. The WTRU of claim 1, wherein the respective bucket size parameter associated with each logical channel in the determined set of one or more logical channels is determined based on at least a bucket size duration.

4. The WTRU of claim 1, wherein the set of resources available for the sidelink transmission is selected by the WTRU autonomously.

5. The WTRU of claim 4, wherein the set of resources available for the sidelink transmission is selected by the WTRU from a preconfigured pool of resources.

6. The WTRU of claim 1, wherein the selected logical channel is a first logical channel associated with the determined destination, and wherein the processor is further configured to determine a second logical channel associated with the determined destination from the determined set of one or more logical channels based on respective minimum communication ranges (MCRs) of the first logical channel and the second logical channel, the processor further configured to multiplex the second logical channel with the first logical channel.

7. The WTRU of claim 6, wherein the processor is configured to determine the second logical channel based on a determination that a difference between the respective MCRs of the first logical channel and the second logical channel is less than a threshold.

8. The WTRU of claim 1, wherein the processor being configured to transmit the data associated with the selected logical channel to the determined destination comprises the processor being configured to determine an amount of data to be transmitted to the determined destination based on the bucket size parameter associated with the selected logical channel.

9. The WTRU of claim 1, wherein the processor is further configured to: determine that the bucket size parameter associated with another logical channel of the determined set of one or more logical channels has a value greater than zero, that the other logical channel has the same priority as the selected logical channel, and that transmitting the data associated with the selected logical channel results in fewer resources being utilized than transmitting data associated with the other logical channel.

10. A method implemented by a wireless transmit receive unit (WTRU), the method comprising:
 determining that a set of resources is available for the WTRU to perform a sidelink transmission;
 determining a set of one or more logical channels, wherein each of the one or more logical channels in the set is determined based on the logical channel having data available for transmission and having a respective bucket size parameter with a value greater than zero, and wherein, on a condition that hybrid automatic repeat request (HARQ) feedback is not configured for the set of resources, each of the one or more logical channels in the set is determined further based on the logical channel having HARQ feedback disabled;
 selecting a logical channel from the determined set of one or more logical channels, wherein the selected logical channel has a highest priority in the determined set of one or more logical channels;
 determining a destination associated with the selected logical channel; and
 transmitting data associated with the selected logical channel to the determined destination using at least a portion of the set of resources available for the sidelink transmission.

11. The method of claim 10, wherein the respective bucket size parameter associated with each logical channel in the determined set of one or more logical channels is determined based on at least a prioritized bit rate.

12. The method of claim 10, wherein the respective bucket size parameter associated with each logical channel in the determined set of one or more logical channels is determined based on at least a bucket size duration.

13. The method of claim 10, wherein the set of resources available for the sidelink transmission is selected by the WTRU autonomously.

14. The method of claim 13, wherein the set of resources available for the sidelink transmission is selected by the WTRU from a preconfigured pool of resources.

15. The method of claim 10, wherein the selected logical channel is a first logical channel associated with the determined destination, and wherein the method further comprises determining a second logical channel associated with the determined destination from the determined set of one or more logical channels based on respective minimum communication ranges (MCRs) of the first logical channel and the second logical channel, and multiplexing the second logical channel with the first logical channel.

16. The method of claim 15, wherein the second logical channel is determined based on a determination that a difference between the respective MCRs of the first logical channel and the second logical channel is less than a threshold.

17. The method of claim 10, further comprising:
 determining that the bucket size parameter associated with another logical channel of the determined set of one or more logical channels has a value greater than zero, that the other logical channel has the same priority as the selected logical channel, and that transmitting the data associated with the selected logical channel results in fewer resources being utilized than transmitting data associated with the other logical channel.

18. The method of claim 10, wherein transmitting the data associated with the selected logical channel to the determined destination comprises determining an amount of data to be transmitted to the determined destination based on the bucket size parameter associated with the selected logical channel.

* * * * *